United States Patent
Sinha et al.

(10) Patent No.: US 10,788,798 B2
(45) Date of Patent: Sep. 29, 2020

(54) BUILDING MANAGEMENT SYSTEM WITH HYBRID EDGE-CLOUD PROCESSING

(71) Applicant: JOHNSON CONTROLS TECHNOLOGY COMPANY, Auburn Hills, MI (US)

(72) Inventors: Sudhi R. Sinha, Milwaukee, WI (US); Youngchoon Park, Brookfield, WI (US)

(73) Assignee: Johnson Controls Technology Company, Auburn Hills, MI (US)

(*) Notice: Subject to any disclaimer, the term of this patent is extended or adjusted under 35 U.S.C. 154(b) by 0 days.

(21) Appl. No.: 16/259,950

(22) Filed: Jan. 28, 2019

(65) Prior Publication Data

US 2020/0241482 A1    Jul. 30, 2020

(51) Int. Cl.
*H04L 29/08*    (2006.01)
*G05B 13/02*    (2006.01)
*G06N 3/04*    (2006.01)

(52) U.S. Cl.
CPC ......... *G05B 13/027* (2013.01); *G06N 3/0454* (2013.01); *H04L 67/10* (2013.01)

(58) Field of Classification Search
CPC .............................. G05B 13/027; G06N 3/0454
See application file for complete search history.

(56) References Cited

U.S. PATENT DOCUMENTS

| | | | |
|---|---|---|---|
| 8,374,725 B1 * | 2/2013 | Ols | F24F 13/1426 700/277 |
| 8,479,099 B2 * | 7/2013 | Miki | G05B 19/409 715/736 |
| 9,429,961 B2 * | 8/2016 | Sprinkle | G05D 23/1917 |
| 9,618,222 B1 * | 4/2017 | Hussain | F24F 11/30 |
| 9,951,965 B2 * | 4/2018 | Call | G05B 19/042 |
| 2008/0277486 A1 * | 11/2008 | Seem | H04L 67/125 236/49.3 |
| 2013/0304239 A1 * | 11/2013 | Turolla | G06Q 10/06 700/79 |
| 2013/0317659 A1 * | 11/2013 | Thomas | H04W 52/0216 700/286 |

(Continued)

FOREIGN PATENT DOCUMENTS

| | | | | |
|---|---|---|---|---|
| WO | WO2018/073590 | * | 4/2018 | G05B 15/02 |
| WO | WO2018073590 | * | 4/2018 | F24F 11/30 |
| WO | WO2018232304 | * | 12/2018 | H04L 63/104 |

*Primary Examiner* — Rocio Del Mar Perez-Velez
*Assistant Examiner* — Olvin Lopez Alvarez
(74) *Attorney, Agent, or Firm* — Foley & Lardner LLP

(57) ABSTRACT

A method includes receiving, by an edge controller, data relating to a first space. The edge controller controls operation of an edge device affecting a characteristic of the first space and that is associated with a first building equipment domain. The method further includes analyzing, by the edge controller, the data to determine whether the data satisfies a condition. If the condition is satisfied, the edge controller controls operation of the edge device using the data. If the condition is not satisfied, the edge controller (a) transmits a request to a cloud controller to analyze the data based on information obtained by the cloud controller regarding at least one of a second space or a second building equipment domain, (b) receives a response to the request from the cloud controller, and (c) controls operation of the edge device using the response from the cloud controller.

26 Claims, 11 Drawing Sheets

(56) References Cited

U.S. PATENT DOCUMENTS

| | | | |
|---|---|---|---|
| 2015/0031381 A1* | 1/2015 | Kotecha | H04W 4/70 455/452.1 |
| 2015/0159893 A1* | 6/2015 | Daubman | G05B 15/02 700/278 |
| 2015/0178421 A1* | 6/2015 | Borrelli | G06F 17/5009 703/7 |
| 2015/0369505 A1* | 12/2015 | Malve | F24F 11/64 700/276 |
| 2016/0200166 A1* | 7/2016 | Stanek | B60H 1/00771 165/202 |
| 2016/0203036 A1* | 7/2016 | Mezic | G06F 11/079 714/819 |
| 2017/0048308 A1* | 2/2017 | Qaisar | H04L 67/1002 |
| 2017/0322534 A1* | 11/2017 | Sinha | G05B 19/0426 |
| 2017/0357225 A1* | 12/2017 | Asp | G05B 15/02 |
| 2018/0167445 A1* | 6/2018 | Speight | G06F 9/5044 |
| 2018/0202675 A1* | 7/2018 | Park | F24F 11/30 |
| 2018/0234787 A1* | 8/2018 | Karimli | H04W 12/0023 |
| 2018/0285767 A1* | 10/2018 | Chew | H04L 67/1097 |
| 2018/0288091 A1* | 10/2018 | Doron | H04L 63/1458 |
| 2018/0299840 A1* | 10/2018 | Sinha | G05B 13/048 |
| 2019/0017719 A1* | 1/2019 | Sinha | G05B 15/02 |
| 2019/0094820 A1* | 3/2019 | Ray | H04L 41/0886 |
| 2019/0094821 A1* | 3/2019 | Stluka | G05B 13/041 |
| 2019/0098113 A1* | 3/2019 | Park | H04L 67/10 |
| 2019/0179270 A1* | 6/2019 | Gervais | G05B 13/0265 |
| 2019/0182333 A1* | 6/2019 | Bartfai-Walcott | H04L 67/125 |
| 2019/0205765 A1* | 7/2019 | Mondello | G06N 3/088 |
| 2019/0301760 A1* | 10/2019 | Gottumukkala | F24F 11/58 |
| 2020/0021640 A1* | 1/2020 | Amento | H04L 67/1097 |

\* cited by examiner

BUILDING MANAGEMENT SYSTEM WITH HYBRID EDGE-CLOUD PROCESSING

BACKGROUND

The present disclosure relates generally to a building management system and more particularly to control of edge devices by a cloud device of a building management system. The present disclosure relates specifically to a building management system configured to divide various processing tasks between one or more edge devices and one or more cloud devices of the building management system.

A building management system (BMS) is, in general, a system of devices configured to control, monitor, and manage equipment in and/or around a building or building area. A BMS can include, for example, an HVAC system, a security system, a lighting system, a fire alerting system, and any other system that is capable of managing building functions or devices, or any combination thereof. Some of the systems include devices that control one or more characteristics of a space (e.g., temperature, humidity, etc.). These characteristics may be affected by many different factors, such as weather and the operation of other devices within the space. However, the devices that control these characteristics often do not account for these factors. Accordingly, intelligent control of the characteristics of a space is desired.

SUMMARY

One implementation of the present disclosure is a method of controlling equipment of a building. The method includes receiving, by an edge controller, data relating to a first space. In some embodiments, the edge controller is configured to control operation of an edge device affecting a characteristic of the first space. In some embodiments, the edge device is associated with a first building equipment domain of a series of building equipment domains. The method further includes analyzing, by the edge controller, the data to determine whether the data satisfies a condition. In response to determining the data satisfies the condition, the method includes controlling, by the edge controller, operation of the edge device using the data. In response to determining the data does not satisfy the condition, the method includes (a) transmitting, by the edge controller, a request to a cloud controller to analyze the data, the cloud controller configured to analyze the data based on information obtained by the cloud controller regarding at least one of a second space or a second building equipment domain, (b) receiving, at the edge controller from the cloud controller, a response to the request, and (c) controlling, by the edge controller, operation of the edge device using the response from the cloud controller.

In some embodiments, the edge controller is a software agent implemented within at least one server separate from the edge device.

In some embodiments, the edge controller is a first edge controller and the edge device is a first edge device. In some embodiments, a second edge controller is a second software agent implemented within the at least one server. In some embodiments, the second edge controller is configured to control operation of a second edge device affecting a characteristic of the second space.

In some embodiments, the cloud controller is implemented within a cloud server. In some embodiments, the first space is defined within a first building. In some embodiments, the cloud server is located within one of (a) the first building or (b) a second building of a building complex that includes the first building.

In some embodiments, the cloud controller is distributed across at least two cloud servers.

In some embodiments, the edge device is a first edge device. In some embodiments, the edge controller is implemented on the first edge device. In some embodiments, the cloud controller is operatively coupled to a second edge device. In some embodiments, the cloud controller is distributed across the first edge device and the second edge device.

In some embodiments, controlling, by the edge controller, operation of the edge device using the data includes analyzing, by the edge controller, the data using a first neural network and controlling the edge device based on the analysis of the data by the edge controller. In some embodiments, controlling, by the edge controller, operation of the edge device using the response from the cloud controller includes modifying, by the edge controller, the first neural network based on the response from the cloud controller and analyzing, by the edge controller, the data using the first neural network, and controlling the edge device based on the analysis of the data by the edge controller.

In some embodiments, the cloud controller is configured to analyze the data using a second neural network. In some embodiments, the second neural network is trained based on the information obtained by the cloud controller regarding the at least one of the second space or the second building equipment domain.

In some embodiments, analyzing, by the edge controller, the data to determine whether the data satisfies a condition includes comparing the data against a series of recognized patterns. In some embodiments, determining that the data does not satisfy the condition includes determining that the data does not match at least one of the recognized patterns.

In some embodiments, analyzing, by the edge controller, the data to determine whether the data satisfies a condition includes determining a level of processing resources required to process the data. In some embodiments, determining that the data does not satisfy the condition includes determining that that the level of processing resources required to process the data is greater than a threshold level.

In some embodiments, analyzing, by the edge controller, the data to determine whether the data satisfies a condition includes determining whether a response of the edge controller to the data would violate a policy of the edge controller. In some embodiments, determining that the data does not satisfy the condition includes determining that the response of the edge controller to the data would violate the policy of the edge controller.

In some embodiments, the edge controller is part of an edge control layer. In some embodiments, the cloud controller is part of a cloud control layer. In some embodiments, the edge control layer communicates directly with the cloud control layer without the use of an intermediate control layer.

In some embodiments, the method further includes recording, by at least one of the cloud controller and the edge controller, historical data relating to a command provided by the edge controller and a corresponding change of the characteristic of the first space and modifying, by the edge controller, a local control scheme of the edge controller based on the historical data. In some embodiments, the edge controller is configured to control operation of the edge device according to the local control scheme.

In some embodiments, the local control scheme of the edge controller does not utilize any one of proportional control logic, integral control logic, or derivative control logic.

In some embodiments, the data includes temperature data. In some embodiments, the characteristic is a temperature of the first space. In some embodiments, the edge device is a thermostat configured to control at least one actuator to affect the temperature of the first space. In some embodiments, the information obtained by the cloud controller regarding at least one of the second space or the second building equipment domain relates to an occupancy level of the first space.

In some embodiments, the data includes temperature data. In some embodiments, the characteristic is a temperature of the first space. In some embodiments, the edge device is a thermostat configured to control at least one actuator to affect the temperature of the first space. In some embodiments, the information obtained by the cloud controller regarding at least one of the second space or the second building equipment domain relates to at least one of a quantity of second edge devices associated with the first space or a type of second edge devices associated with the first space.

Another implementation of the present disclosure is a method of controlling equipment of a first space of a building. The method includes receiving, by an edge controller, first data and second data relating to the first space, the edge controller configured to control operation of an edge device affecting a characteristic of the first space. In response to receiving the first data, the method further includes transmitting, by the edge controller, a request to a cloud controller to analyze the data and controlling, by the edge controller, the edge device using a response received from the cloud controller to the request. In response to receiving the second data, the method includes controlling, by the edge controller, the edge device using information available to the edge controller without transmitting a request to the cloud controller.

In some embodiments, the edge controller is a software agent implemented within at least one server separate from the edge device.

In some embodiments, the edge controller is a first edge controller and the edge device is a first edge device. In some embodiments, a second edge controller is a second software agent implemented within the at least one server. In some embodiments, the second edge controller is configured to control operation of a second edge device affecting a characteristic of a second space.

In some embodiments, the cloud controller is implemented within a cloud server. In some embodiments, the first space is defined within a first building. In some embodiments, the cloud server is located within one of (a) the first building or (b) a second building of a building complex that includes the first building.

In some embodiments, the cloud controller is distributed across at least two cloud servers.

In some embodiments, the edge device is a first edge device. In some embodiments, the edge controller is implemented on the first edge device. In some embodiments, the cloud controller is operatively coupled to a second edge device. In some embodiments, the cloud controller is distributed across the first edge device and the second edge device.

In some embodiments, controlling, by the edge controller, operation of the edge device using the response received from the cloud controller to the request includes modifying, by the edge controller, a first neural network based on the response received from the cloud controller, analyzing, by the edge controller, the first data using the first neural network, and controlling the edge device based on the analysis of the first data by the edge controller. In some embodiments, controlling, by the edge controller, operation of the edge device using the response from the cloud controller includes analyzing, by the edge controller, the second data using the first neural network and controlling the edge device based on the analysis of the second data by the edge controller.

In some embodiments, the edge device is associated with a first building equipment domain. In some embodiments, the cloud controller is configured to analyze the data using a second neural network. In some embodiments, the second neural network is trained based on information obtained by the cloud controller regarding at least one of a second space or a second building equipment domain.

In some embodiments, the first data does not match one of a series of recognized patterns that are recognized by the edge controller. In some embodiments, the second data matches at least one of the series of recognized patterns.

In some embodiments, the first data requires a first level of processing resources to process, and the first level is greater than a threshold level. In some embodiments, the second data requires a second level of processing resources to process, and the second level is less than a threshold level.

In some embodiments, the edge controller is part of an edge control layer. In some embodiments, the cloud controller is part of a cloud control layer. In some embodiments, the edge control layer communicates directly with the cloud control layer without the use of an intermediate control layer.

In some embodiments, the method further includes recording, by at least one of the cloud controller and the edge controller, historical data relating to a command provided by the edge controller and a corresponding change of the characteristic of the first space and modifying, by the edge controller, a local control scheme of the edge controller based on the historical data. In some embodiments, the edge controller is configured to control the edge device according to the local control scheme.

In some embodiments, the local control scheme of the edge controller does not utilize any one of proportional control logic, integral control logic, or derivative control logic.

In some embodiments, first data includes first temperature data and second data includes second temperature data. In some embodiments, the characteristic is a temperature of the first space. In some embodiments, the edge device is a thermostat configured to control at least one actuator to affect the temperature of the first space. In some embodiments, the cloud controller is configured to analyze the first data based on an occupancy level of the first space.

In some embodiments, the first data includes first temperature data and the second data includes second temperature data. In some embodiments, the characteristic is a temperature of the first space. In some embodiments, the edge device is a thermostat configured to control at least one actuator to affect the temperature of the first space. In some embodiments, the cloud controller is configured to analyze the first data based on at least one of a quantity of second edge devices associated with the first space or a type of second edge devices associated with the first space.

Another implementation of the present disclosure is a method of controlling equipment of a building. The method includes receiving, at a cloud controller, a request to analyze data relating to a first space from an edge controller. In some embodiments, the edge controller is configured to control operation of an edge device affecting a characteristic of the first space. In some embodiments, the edge device is associated with a first building equipment domain of a series of building equipment domains. The method further includes analyzing, by the cloud controller, the data based on information obtained by the cloud controller regarding at least one of a second space or a second building equipment domain. The method further includes generating, by the cloud controller based on the analysis of the data, an edge control adaptation command configured to cause the edge controller to modify a local control scheme of the edge controller. The method further includes transmitting, by the cloud controller, the edge control adaptation command to the edge controller.

In some embodiments, the local control scheme includes a neural network configured to utilize the data relating to the first space. In some embodiments, the adaptation command is configured to cause the edge controller to modify the neural network of the local control scheme based on the analysis of the data by the cloud controller.

In some embodiments, the edge controller is a first edge controller and the edge device is a first edge device. In some embodiments, the edge control adaptation command is configured to cause the edge controller modify the local control scheme to utilize additional data provided by a second edge controller of a second edge device.

In some embodiments, the adaptation command is configured to cause the first edge controller to retrieve the additional data directly from the second edge controller without the additional data passing through the cloud controller.

In some embodiments, the characteristic is a first characteristic. In some embodiments, the second edge controller is configured to control operation of the second edge device to affect a second characteristic of the first space. In some embodiments, the second edge device is associated with the second building equipment domain.

In some embodiments, the second edge controller is configured to control operation of the second edge device to affect a characteristic of the second space.

In some embodiments, analyzing, by the cloud controller, the data based on information obtained by the cloud controller regarding at least one of the second space or the second building equipment domain includes determining whether the data satisfies a condition. In some embodiments, the edge control adaptation command is generated in response to determining that the data satisfies the condition. In some embodiments, the edge control adaptation command is configured to cause the edge controller to modify the local control scheme such that the edge controller (a) determines locally whether subsequent data satisfies the condition and (b) in response to determining that the subsequent data satisfies the condition, controls the edge device without requesting for the cloud controller to analyze the subsequent data.

In some embodiments, determining whether the data satisfies the condition includes comparing the data against a series of recognized patterns, and wherein the data satisfies the condition when the data matches one of the recognized patterns.

In some embodiments, the edge controller is a first edge controller and the edge device is a first edge device. In some embodiments, the first edge controller is a software agent implemented within at least one server separate from the first edge device. In some embodiments, the first edge controller is configured to subscribe to messages transmitted by a second edge controller of a second edge device.

In some embodiments, the edge controller is part of an edge control layer. In some embodiments, the cloud controller is part of a cloud control layer. In some embodiments, the edge control layer communicates directly with the cloud control layer without the use of an intermediate control layer.

In some embodiments, the edge controller is a software agent implemented within at least one server separate from the edge device.

In some embodiments, the edge controller is a first edge controller and the edge device is a first edge device. In some embodiments, a second edge controller is a second software agent implemented within the at least one server. In some embodiments, the second edge controller is configured to control operation of a second edge device affecting a characteristic of the second space.

In some embodiments, the cloud controller is implemented within a cloud server. In some embodiments, the first space is defined within a first building. In some embodiments, the cloud server is located within one of (a) the first building or (b) a second building of a building complex that includes the first building.

In some embodiments, the cloud controller is distributed across at least two cloud servers.

In some embodiments, the edge device is a first edge device. In some embodiments, the edge controller is implemented on the first edge device. In some embodiments, the cloud controller is operatively coupled to a second edge device. In some embodiments, the cloud controller is distributed across the first edge device and the second edge device.

In some embodiments, the local control scheme of the edge controller includes a first neural network. In some embodiments, the edge control adaptation command is configured to modify the first neural network.

In some embodiments, the cloud controller is configured to analyze the data using a second neural network. In some embodiments, the second neural network is trained based on the information obtained by the cloud controller regarding the at least one of the second space or the second building equipment domain.

In some embodiments, the request to analyze the data is generated by the edge controller in response to a determination that the data does not match a recognized pattern.

In some embodiments, the request to analyze the data is generated by the edge controller in response to determining that that a level of processing resources required to process the data is greater than a threshold level.

In some embodiments, the request to analyze the data is generated by the edge controller in response to determining that a response of the edge controller to the data would violate a policy of the edge controller.

In some embodiments, the method further includes recording, by the cloud controller, historical data relating to a command provided by the edge controller and a corresponding change of the characteristic of the first space.

In some embodiments, the local control scheme of the edge controller does not utilize any one of proportional control logic, integral control logic, or derivative control logic.

In some embodiments, the data includes temperature data. In some embodiments, the characteristic is a temperature of the first space. In some embodiments, the edge device is a thermostat configured to control at least one actuator to affect the temperature of the first space. In some embodiments, the information obtained by the cloud controller regarding at least one of the second space or the second building equipment domain relates to an occupancy level of the first space.

In some embodiments, the data includes temperature data. In some embodiments, the characteristic is a temperature of the first space. In some embodiments, the edge device is a thermostat configured to control at least one actuator to affect the temperature of the first space. In some embodiments, the information obtained by the cloud controller regarding at least one of the second space or the second building equipment domain relates to at least one of a quantity of second edge devices associated with the first space or a type of second edge devices associated with the first space.

Another implementation of the present disclosure is a method of controlling equipment of a building. The method includes determining, by a cloud controller, whether data relating to a first space satisfies a condition. In some embodiments, the first space has a characteristic affected by an edge device. In some embodiments, the edge device is associated with a first building equipment domain of a series of building equipment domains. In response to determining the data does not satisfy the condition, the method includes (a) analyzing, by the cloud controller, the data based on information obtained by the cloud controller regarding at least one of a second space or a second building equipment domain, (b) generating, by the cloud controller based on the analysis of the data, an edge control adaptation command configured to cause an edge controller to modify a local control scheme of the edge controller, the edge controller being configured to control operation the edge device, and (c) transmitting, by the cloud controller, the edge control adaptation command to the edge controller.

In some embodiments, determining, by the cloud controller, whether the data satisfies a condition includes comparing the data against a series of recognized patterns. In some embodiments, determining that the data does not satisfy the condition includes determining that the data does not match at least one of the recognized patterns.

In some embodiments, determining, by the cloud controller, whether the data satisfies a condition includes at least one of (a) determining whether the data includes information relating to operation of a second edge device that was not previously in communication with the cloud controller or (b) determining whether the data does not include information relating to operation of a third edge device that was previously in communication with the cloud controller. In some embodiments, determining that the data does not satisfy the condition includes at least one of (a) determining that the data includes information relating to the operation of the second edge device that was not previously in communication with the cloud controller or (b) determining that the data does not include information relating to operation of the third edge device that was previously in communication with the cloud controller.

In some embodiments, the local control scheme includes a neural network configured to utilize the data relating to the first space. In some embodiments, the adaptation command is configured to cause the edge controller to modify the neural network of the local control scheme based on the analysis of the data by the cloud controller.

In some embodiments, the edge controller is a first edge controller and the edge device is a first edge device. In some embodiments, the edge control adaptation command is configured to cause the edge controller modify the local control scheme to utilize additional data provided by a second edge controller of a second edge device.

In some embodiments, the adaptation command is configured to cause the first edge controller to retrieve the additional data directly from the second edge controller without the additional data passing through the cloud controller.

In some embodiments, the characteristic is a first characteristic. In some embodiments, the second edge controller is configured to control operation of the second edge device to affect a second characteristic of the first space. In some embodiments, the second edge device is associated with the second building equipment domain.

In some embodiments, the second edge controller is configured to control operation of the second edge device to affect a characteristic of the second space.

In some embodiments, analyzing, by the cloud controller, the data based on information obtained by the cloud controller regarding at least one of the second space or the second building equipment domain includes determining whether the data satisfies a condition. In some embodiments, the edge control adaptation command is generated in response to determining that the data satisfies the condition. In some embodiments, the edge control adaptation command is configured to cause the edge controller to modify the local control scheme such that the edge controller (a) determines locally whether subsequent data satisfies the condition and (b) in response to determining that the subsequent data satisfies the condition, controls the edge device without requesting for the cloud controller to analyze the subsequent data.

In some embodiments, determining whether the data satisfies the condition includes comparing the data against a series of recognized patterns, and wherein the data satisfies the condition when the data matches one of the recognized patterns.

In some embodiments, the edge controller is a first edge controller and the edge device is a first edge device. In some embodiments, the first edge controller is a software agent implemented within at least one server separate from the first edge device. In some embodiments, the first edge controller is configured to subscribe to messages transmitted by a second edge controller of a second edge device.

In some embodiments, the edge controller is part of an edge control layer. In some embodiments, the cloud controller is part of a cloud control layer. In some embodiments, the edge control layer communicates directly with the cloud control layer without the use of an intermediate control layer.

In some embodiments, the edge controller is a software agent implemented within at least one server separate from the edge device.

In some embodiments, the edge controller is a first edge controller and the edge device is a first edge device. In some embodiments, a second edge controller is a second software agent implemented within the at least one server. In some embodiments, the second edge controller is configured to control operation of a second edge device affecting a characteristic of the second space.

In some embodiments, the cloud controller is implemented within a cloud server. In some embodiments, the first space is defined within a first building. In some embodiments, the cloud server is located within one of (a) the first building or (b) a second building of a building complex that includes the first building.

In some embodiments, the cloud controller is distributed across at least two cloud servers.

In some embodiments, the edge device is a first edge device. In some embodiments, the edge controller is implemented on the first edge device. In some embodiments, the cloud controller is operatively coupled to a second edge device. In some embodiments, the cloud controller is distributed across the first edge device and the second edge device.

In some embodiments, the local control scheme of the edge controller includes a first neural network. In some embodiments, the edge control adaptation command is configured to modify the first neural network.

In some embodiments, the cloud controller is configured to analyze the data using a second neural network. In some embodiments, the second neural network is trained based on the information obtained by the cloud controller regarding the at least one of the second space or the second building equipment domain.

In some embodiments, the request to analyze the data is generated by the edge controller in response to a determination that the data does not match a recognized pattern.

In some embodiments, the request to analyze the data is generated by the edge controller in response to determining that that a level of processing resources required to process the data is greater than a threshold level.

In some embodiments, the request to analyze the data is generated by the edge controller in response to determining that a response of the edge controller to the data would violate a policy of the edge controller.

In some embodiments, the method further includes recording, by the cloud controller, historical data relating to a command provided by the edge controller and a corresponding change of the characteristic of the first space.

In some embodiments, the local control scheme of the edge controller does not utilize any one of proportional control logic, integral control logic, or derivative control logic.

In some embodiments, the data includes temperature data. In some embodiments, the characteristic is a temperature of the first space. In some embodiments, the edge device is a thermostat configured to control at least one actuator to affect the temperature of the first space. In some embodiments, the information obtained by the cloud controller regarding at least one of the second space or the second building equipment domain relates to an occupancy level of the first space.

In some embodiments, the data includes temperature data. In some embodiments, the characteristic is a temperature of the first space. In some embodiments, the edge device is a thermostat configured to control at least one actuator to affect the temperature of the first space. In some embodiments, the information obtained by the cloud controller regarding at least one of the second space or the second building equipment domain relates to at least one of a quantity of second edge devices associated with the first space or a type of second edge devices associated with the first space.

Another implementation of the present disclosure is a building management system. The building management system includes at least one server containing a cloud controller and configured to be operatively coupled to an edge controller. In some embodiments, the edge controller is configured to control operation of an edge device associated with a first building equipment domain of a series of building equipment domains. The building management system further includes a non-transitory computer-readable medium having computer-executable instructions encoded therein for operation of the edge controller, the instructions when executed by the edge controller cause the edge controller to (a) receive data relating to the first space, (b) determine whether the data satisfies a condition, (c) in response to determining the data satisfies the condition, control the operation of the edge device using the data according to a local control scheme, and (d) in response to determining the data does not satisfy the condition, transmit a request to the cloud controller to analyze the data. In some embodiments, in response to receiving the request to analyze the data, the cloud controller is configured to (a) analyze the data based on information obtained by the cloud controller regarding at least one of a second space or a second building equipment domain, (b) generate an edge control adaptation command configured to cause an edge controller to modify the local control scheme of the edge controller based on the analysis of the data, and (c) transmit the edge control adaptation command to the edge controller.

In some embodiments, the local control scheme includes a neural network configured to utilize the data relating to the first space. In some embodiments, the adaptation command is configured to cause the edge controller to modify the neural network of the local control scheme based on the analysis of the data by the cloud controller.

In some embodiments, the edge controller is a first edge controller and the edge device is a first edge device. In some embodiments, the edge control adaptation command is configured to cause the edge controller modify the local control scheme to utilize additional data provided by a second edge controller of a second edge device.

In some embodiments, the adaptation command is configured to cause the first edge controller to retrieve the additional data directly from the second edge controller without the additional data passing through the cloud controller.

In some embodiments, the characteristic is a first characteristic. In some embodiments, the second edge controller is configured to control operation of the second edge device to affect a second characteristic of the first space. In some embodiments, the second edge device is associated with the second building equipment domain.

In some embodiments, the second edge controller is configured to control operation of the second edge device to affect a characteristic of the second space.

In some embodiments, the edge controller is a first edge controller and the edge device is a first edge device. In some embodiments, the first edge controller is a software agent implemented within at least one server separate from the first edge device. In some embodiments, the first edge controller is configured to subscribe to messages transmitted by a second edge controller of a second edge device.

In some embodiments, the edge controller is part of an edge control layer. In some embodiments, the cloud controller is part of a cloud control layer. In some embodiments, the edge control layer communicates directly with the cloud control layer without the use of an intermediate control layer.

In some embodiments, the edge controller is a software agent implemented within at least one server separate from the edge device.

In some embodiments, the edge controller is a first edge controller and the edge device is a first edge device. In some embodiments, a second edge controller is a second software agent implemented within the at least one server. In some embodiments, the second edge controller is configured to control operation of a second edge device affecting a characteristic of the second space.

In some embodiments, the cloud controller is implemented within a cloud server. In some embodiments, the first space is defined within a first building. In some embodiments, the cloud server is located within one of (a) the first building or (b) a second building of a building complex that includes the first building.

In some embodiments, the cloud controller is distributed across at least two cloud servers.

In some embodiments, the edge device is a first edge device. In some embodiments, the edge controller is implemented on the first edge device. In some embodiments, the cloud controller is operatively coupled to a second edge device. In some embodiments, the cloud controller is distributed across the first edge device and the second edge device.

In some embodiments, the local control scheme of the edge controller includes a first neural network. In some embodiments, the edge control adaptation command is configured to modify the first neural network.

In some embodiments, the cloud controller is configured to analyze the data using a second neural network. In some embodiments, the cloud controller trains the second neural network based on the information regarding the at least one of the second space or the second building equipment domain.

In some embodiments, the edge controller determines whether the data satisfies a condition by comparing the data against a series of recognized patterns. In some embodiments, determining that the data does not satisfy the condition includes determining that the data does not match at least one of the recognized patterns.

In some embodiments, the edge controller determines whether the data satisfies a condition by determining a level of processing resources required to process the data. In some embodiments, determining that the data does not satisfy the condition includes determining that that the level of processing resources required to process the data is greater than a threshold level.

In some embodiments, the edge controller determines whether the data satisfies a condition by determining whether a response of the edge controller to the data would violate a policy of the edge controller. In some embodiments, determining that the data does not satisfy the condition includes determining that the response of the edge controller to the data would violate the policy of the edge controller.

In some embodiments, at least one of the cloud controller and the edge controller are configured to record historical data relating to a command provided by the edge controller and a corresponding change of the characteristic of the first space. In some embodiments, the edge controller is configured to modify the local control scheme based on the historical data.

In some embodiments, the local control scheme of the edge controller does not utilize any one of proportional control logic, integral control logic, or derivative control logic.

In some embodiments, the data includes temperature data. In some embodiments, the characteristic is a temperature of the first space. In some embodiments, the edge device is a thermostat configured to control at least one actuator to affect the temperature of the first space. In some embodiments, the information obtained by the cloud controller regarding at least one of the second space or the second building equipment domain relates to an occupancy level of the first space.

In some embodiments, the data includes temperature data. In some embodiments, the characteristic is a temperature of the first space. In some embodiments, the edge device is a thermostat configured to control at least one actuator to affect the temperature of the first space. In some embodiments, the information obtained by the cloud controller regarding at least one of the second space or the second building equipment domain relates to at least one of a quantity of second edge devices associated with the first space or a type of second edge devices associated with the first space.

BRIEF DESCRIPTION OF THE DRAWINGS

The above and other aspects and features of the present disclosure will become more apparent to those skilled in the art from the following detailed description of the example embodiments with reference to the accompanying drawings.

DETAILED DESCRIPTION

Overview

Referring generally to the FIGURES, a building management system utilizing hybrid edge/cloud processing is shown, according to various exemplary embodiments. As shown, the building management system includes a cloud controller in communication with a series of edge devices. The cloud controller may be a global controller that controls multiple edge devices associated with multiple spaces. These spaces may be spaces within or near the same building, spaces within a building complex, and/or spaces within or near separate buildings. Each edge device may be configured to control one or more characteristics of an associated space (e.g., a temperature, a lighting condition, etc.). Additionally or alternatively, each edge device may be configured to provide input data to the cloud controller and/or to another edge device. The input data may relate to the characteristic of the associated space (e.g., temperature data relating to the temperature of the space, etc.). Additionally or alternatively, the input data may relate to an operational state of the edge device.

Each edge device can be controlled by an edge controller. The edge controller may be stored locally (e.g., based in hardware) on the edge device or may be a software-defined controller for the edge device stored within a cloud device. The edge device can receive input data from one or more sensors and/or other edge devices. The edge device can generate a command for an actuator using the input data according to a local control scheme. In some situations, the input data may not exhibit one or more local processing conditions that indicate processing of the data should be performed by the edge controller. When the input data fails to exhibit one or more of the local processing conditions, the edge controller may send a processing request to the cloud controller. Upon receiving the processing request, the cloud controller may analyze the input data based on information from other sources (e.g., other edge devices, external data sources, etc.) and generate an edge control adaptation command for the edge controller. Upon receiving the edge control adaptation command, the edge controller may vary the local control scheme and generate the command for the actuator according to the updated control scheme.

Figure 1:
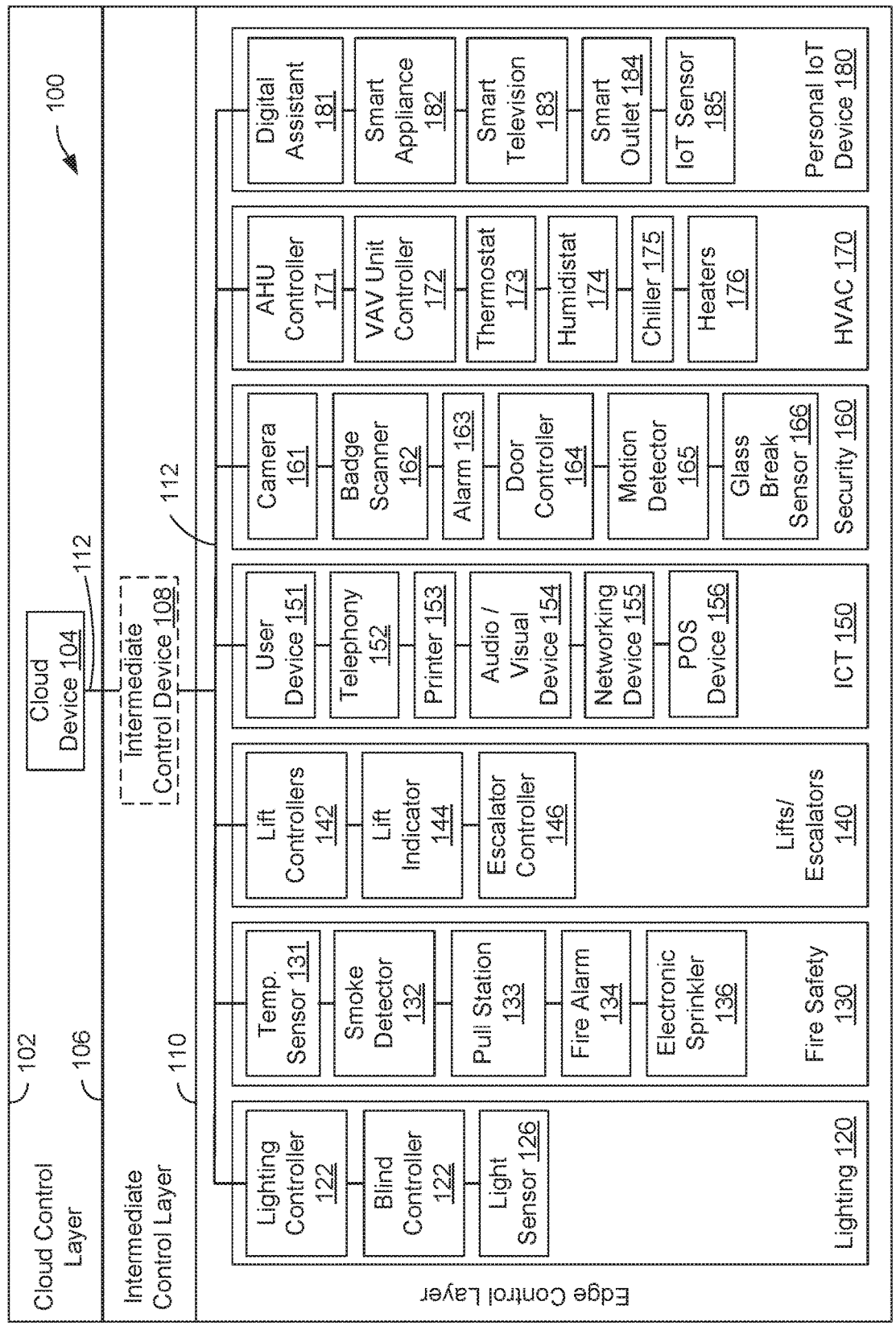
FIG. 1 is a block diagram of a building management system, according to an exemplary embodiment.

Hereinafter, example embodiments will be described in more detail with reference to the accompanying drawings. FIG. 1 is a block diagram of a building management system or building control system, shown as building system 100, according to some exemplary embodiments. Building system 100 is shown to include a first control layer, shown as cloud control layer 102. Cloud control layer 102 is shown to include a cloud device 104 (e.g., a cloud server) that may be configured to store and process data. In other embodiments, cloud control layer 102 includes multiple cloud devices 104. In some embodiments, building system 100 further includes an intermediate control layer 106 including a secondary control device, shown as intermediate control device 108. In some embodiments, intermediate control layer 106 includes multiple intermediate control devices 108. In other embodiments, intermediate control layer 106 is omitted. As shown, building system 100 further includes a third control layer, shown as edge control layer 110, including multiple edge devices (e.g., lighting controllers 122, temperature sensors 131, etc.). Information (e.g., data, commands, etc.) can pass between the cloud control layer 102, the intermediate control layer 106, and the edge control layer through a network 112.

Edge control layer 110 is shown to include a series of edge devices in communication with the controller through network 112. As used herein, the term "edge devices" refers to one or more pieces of building equipment or other devices in communication with the cloud device 104 (e.g., directly through network 112, indirectly through one or more intermediate control devices 108, etc.) that are configured to process data and that are logically furthest from cloud device 104. By way of example, in one scenario, a first device connected to cloud device 104 processes data and sends the processed data to a second device. The second device subsequently processes the data again and uses the processed data to determine some action to be performed. In this scenario, the first device may be an intermediate control device, and the second device may be an edge device.

An edge device may perform an action itself, or the edge device may cause another piece of building equipment (e.g., an actuator) to perform the action. By way of example, the edge device may be a smart light including a built-in lighting controller. The lighting controller of the smart light may receive a command from cloud device 104 (e.g., directly through network 112, indirectly through intermediate control device 108) and in response to the command, activate or deactivate an LED of the smart light in response to the command. By way of another example, the edge device may be a lighting controller that selectively directs electrical energy to one or more LEDs that are physically separated from a housing of the lighting controller. The lighting controller may receive a command from cloud device 104 and in response to the command, activate or deactivate one or more of the LEDs.

Cloud control layer 102, intermediate control layer 106, and/or edge control layer 110 can cooperate to control the operation of the edge devices to achieve one or more desired effects. By way of example, the edge devices may be controlled to bring a characteristic (e.g., a temperature, a light intensity, a sound intensity, etc.) of a space within a desired range. Although FIG. 1 illustrates the inclusion of intermediate control device 108, in some embodiments intermediate control layer 106 is omitted, and all of the processing required to control the edge devices is performed within cloud control layer 102 and/or edge control layer 110. Such an arrangement may be more desirable than an embodiment that includes intermediate control layer 106, as the complexity, and therefore the cost, of the building system 100 is reduced. Additionally, by removing the need for information to be transferred between intermediate control layer 106 and edge control layer 110, building system 100 may be able to process information more quickly.

The edge devices can each be associated with one or more specific spaces (e.g., an office, operating room, or bathroom within a building, an outdoor patio area of a building, etc.) of a building. The edge devices can perform one or more actions to affect a characteristic (e.g., temperature, humidity, light intensity, sound intensity, etc.) of the associated spaces. The effect on the characteristic may be a desired effect (e.g., the edge device is designed to control a specific characteristic of a space). By way of example, the edge devices may include a thermostat that controls a damper to vary a flow of hot air into the associated space, thereby controlling a temperature of the space. The effect on the characteristic may alternatively occur as a byproduct of performing another desired function. By way of example, a printer, a computer, or a server may output thermal energy during operation (e.g., while printing, while computing, etc.), increasing the temperature of the associated space. While the production of the thermal energy may not be the desired effect of operating such edge devices, these edge devices may not be able to operate properly without generating thermal energy.

The edge devices may additionally or alternatively be configured to provide input data relating to the associated space. The edge devices can communicate with cloud device 104 and/or with one another to provide the input data. In some embodiments, the edge devices include one or more sensors (e.g., the sensors 712) that provide sensor data (e.g., relating to a characteristic of the associated space). By way of example, the edge device may be a thermostat, and the edge device may include a temperature sensor (e.g., a thermocouple) that provides sensor data relating to a temperature of the associated space. By way of another example, the edge device may be a lighting controller, and the edge device may include a light sensor that provides sensor data relating to a light intensity of the associated space. In some embodiments, the edge device is configured to provide operational data relating to the operation of the edge device. By way of example, an edge device may provide operational data relating to the operation of the edge device that affects the characteristic of the space. Such operational data can include, but is not limited to, an on/off state, an operating mode, actions that have been performed, are currently being performed, or will be performed in the future, and/or a quantifier describing an action (e.g., the edge device is currently operating at 80% of its capacity, the edge device is currently outputting 200 watts of thermal energy, etc.).

As shown, the edge devices are organized into different groups or subsystems, referred to herein as building equipment domains, based on the functionality of the edge device. Each building equipment domain can include edge devices that perform similar or related functions (e.g., functions that control or facilitate control of the same characteristic of a space, functions that provide similar benefits, etc.). As shown, building system 100 includes the following building equipment domains: a lighting domain 120, a fire safety domain 130, a lift/escalator domain 140, an information and communication technologies (ICT) domain 150, a security domain 160, a heating ventilation and air conditioning (HVAC) domain 170, and a personal internet of things (IoT) domain 180. Although certain building equipment domains are shown, in other embodiments building system 100 includes more, fewer, or alternative building equipment domains.

In some embodiments, lighting domain 120 includes edge devices that control the lighting of a space. Specifically, the edge devices of lighting domain 120 may control characteristics such as the color, intensity, frequency (e.g., time period between flashes of a strobe light), location, and/or other aspects of the light within a space. The light may originate from external sources (e.g., through external windows) or internal sources (e.g., one or more LED lights within the space, etc.). As shown, lighting domain 120 includes lighting controllers 122, blind controllers 124, and light sensors 126. In other embodiments, lighting domain 120 includes more, fewer, or alternative edge devices.

In some embodiments, fire safety domain 130 includes edge devices that detect and/or respond to the presence of a fire. Specifically, the edge devices of fire safety domain 130 may detect and/or locate a fire or a potential indicator of a fire (e.g., an elevated temperature, an interaction with an emergency pull station, etc.). The edge devices of fire safety domain 130 may act to control, suppress, or extinguish a fire (e.g., through the deployment of one or more fire suppressant agents, etc.). The edge devices of fire safety domain 130 may provide an indication that a fire is present (e.g., a visual or auditory alarm to occupants of a building, a signal to firefighting personnel, etc.). Characteristics of spaces affected by the edge devices of fire safety domain 130 can include whether or not a fire is present in a space and the on/off state of a visual or auditory alarm that can be detected within the space. As shown, fire safety domain 130 includes temperature sensors 131, smoke detectors 132, pull stations 133, fire alarms 134, and electronic sprinklers 136. In other embodiments, fire safety domain 130 includes more, fewer, or alternative edge devices.

In some embodiments, lift/escalator domain 140 includes edge devices that operate or facilitate the operation of building equipment that transports occupants and/or cargo throughout a building or building complex, such as an elevator or lift, an escalator, a moving sidewalk, or a train. Specifically, the edge devices may control the speed and/or direction of the lift, escalator, moving sidewalk, or train. The edge devices may additionally or alternatively control one or more indicators (e.g., displays indicating the current floor, bells indicating that the lift has arrived, etc.). Characteristics of spaces affected by the edge devices of lift/escalator domain 140 can include the movement of the lift, escalator, moving sidewalk, or train through the space, light intensity, and sound intensity. As shown, lift/escalator domain 140 includes lift controllers 142, lift indicators 144, and escalator controllers 146. In other embodiments, lift/escalator domain 140 includes more, fewer, or alternative edge devices.

In some embodiments, ICT domain 150 includes edge devices that store, manage, transmit, and/or present information (e.g., visually, acoustically, etc.), such as networking devices (e.g., servers, switches, etc.), telephones, personal computers, and audio/visual devices, cameras, point of sale (POS) devices. Characteristics of spaces affected by the edge devices of ICT domain 150 can include temperature, light intensity, and sound intensity. As shown, ICT domain 150 includes user devices 151 (e.g., smartphones, personal computers, etc.), telephony 152, printers 153, audio/visual devices 154, networking devices 155, and POS devices 156. In other embodiments, ICT domain 150 includes more, fewer, or alternative edge devices.

In some embodiments, ICT domain 150 includes devices that manage (e.g., edit, view, store, etc.) schedules (e.g., of users, of equipment, etc.), emails, and/or tasklists. Such data may be used to determine the occupancy of one or more spaces. By way of example, a smartphone may provide a user's schedule which indicates where (e.g., a specific space) the user is scheduled be located at different points throughout the day. Such data from multiple devices may be used in combination as occupancy data that indicates the number of users in a space at a given time.

In some embodiments, security domain 160 includes edge devices that manage the security of the associated spaces. Specifically, the edge devices may control access to spaces, detect intrusion into a space, and/or indicate when a space has been broken into. The edge devices may be used to identify one or more individuals or objects (e.g., vehicles). By way of example, a camera utilizing image recognition logic may be identify one or more users or vehicles (e.g., license plates). Such information may be used to determine how many users occupy a certain space. Characteristics of spaces affected by edge devices of security domain 160 can include sound intensity and light intensity. As shown, security domain 160 includes cameras 161, badge scanners 162, alarms 163, door controllers 164, motion detectors 165, and glass break sensors 166. In other embodiments, security domain 160 includes more, fewer, or alternative edge devices.

In some embodiments, HVAC domain 170 includes edge devices that manage properties of air within associated spaces. Specifically, the edge devices of HVAC domain 170 may control characteristics such as the temperature, air quality, and humidity of air within a space. The edge devices may heat, cool, filter, exchange, or otherwise affect the air within the associated space, controlling the comfort of occupants within the space. As shown, lighting domain 120 includes air handling unit (AHU) controllers 171, variable air volume (VAV) unit controllers 172, thermostats 173, humidistats 174, chillers 175, and heaters 176. In other embodiments, lighting domain 120 includes more, fewer, or alternative edge devices.

In some embodiments, personal IoT domain 180 includes edge devices that have one or more smart functions that assist a user with various tasks. Specifically, the edge devices may generate and/or provide suggestions for a user based on information known about the user and/or retrieved from the Internet or a cloud service. The edge devices may include one or more robots that assist one or more users (e.g., by speaking with the users, by physically interacting with one or more users, etc.). By way of example, in response to a query regarding the location of an event, a robot may indicate that a user should follow them, and take the user to a room in which the event is scheduled. Characteristics of spaces affected by edge devices of personal IoT domain 180 can include sound intensity, light intensity, and a temperature of the space. As shown, personal IoT domain 180 includes digital assistants 181, smart appliances 182 (e.g., smart refrigerators, smart grills, smart coffee makers, etc.), smart televisions 183, smart outlets 184, and IoT sensors 185 (e.g., motion detectors, temperature sensors, microphones, cameras, buttons, switches, etc.). In other embodiments, personal IoT domain 180 includes more, fewer, or alternative edge devices.

Building HVAC Systems and Building Management Systems

Figure 2:
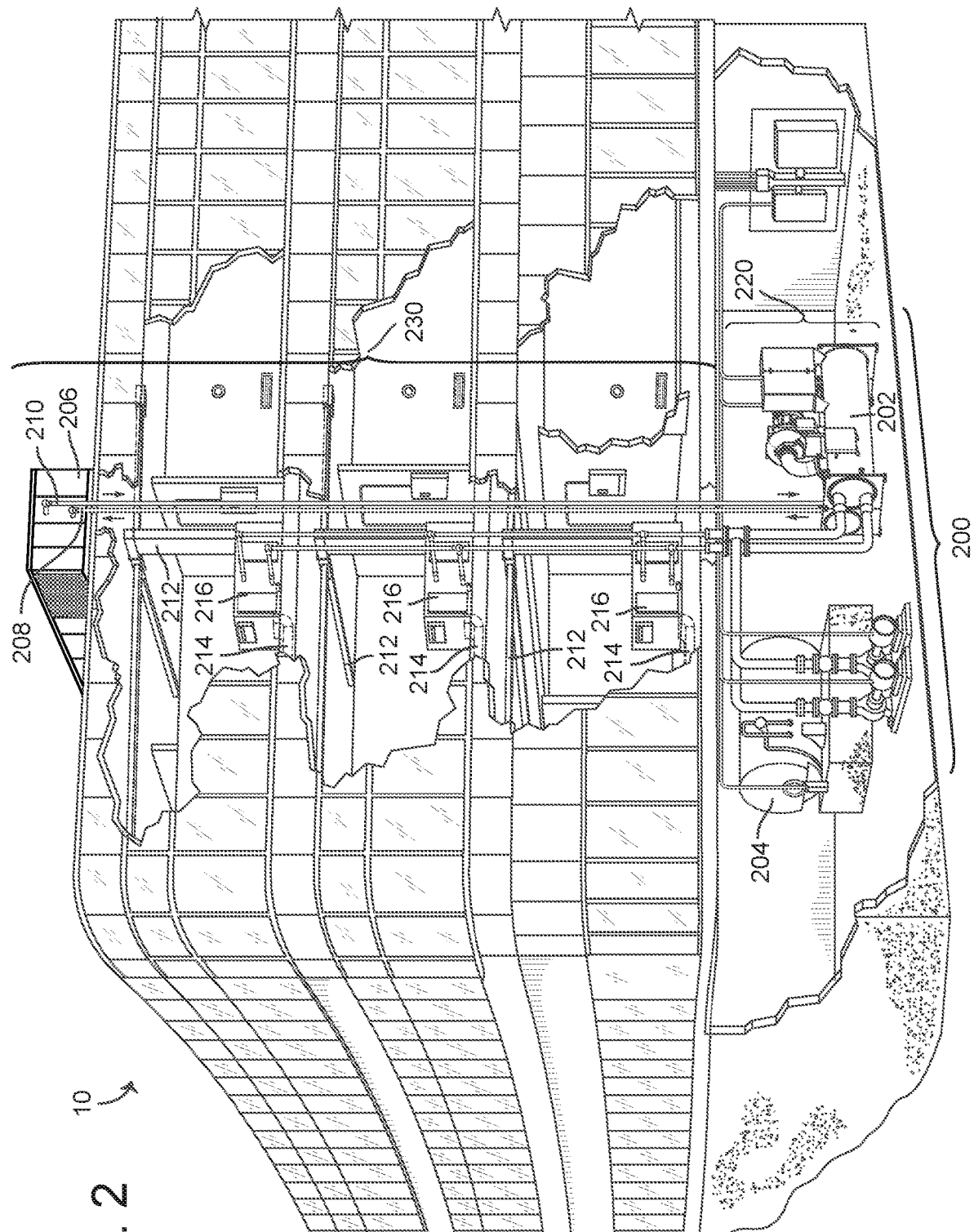
FIG. 2 is a perspective view of a building, according to an exemplary embodiment.
Figure 3:
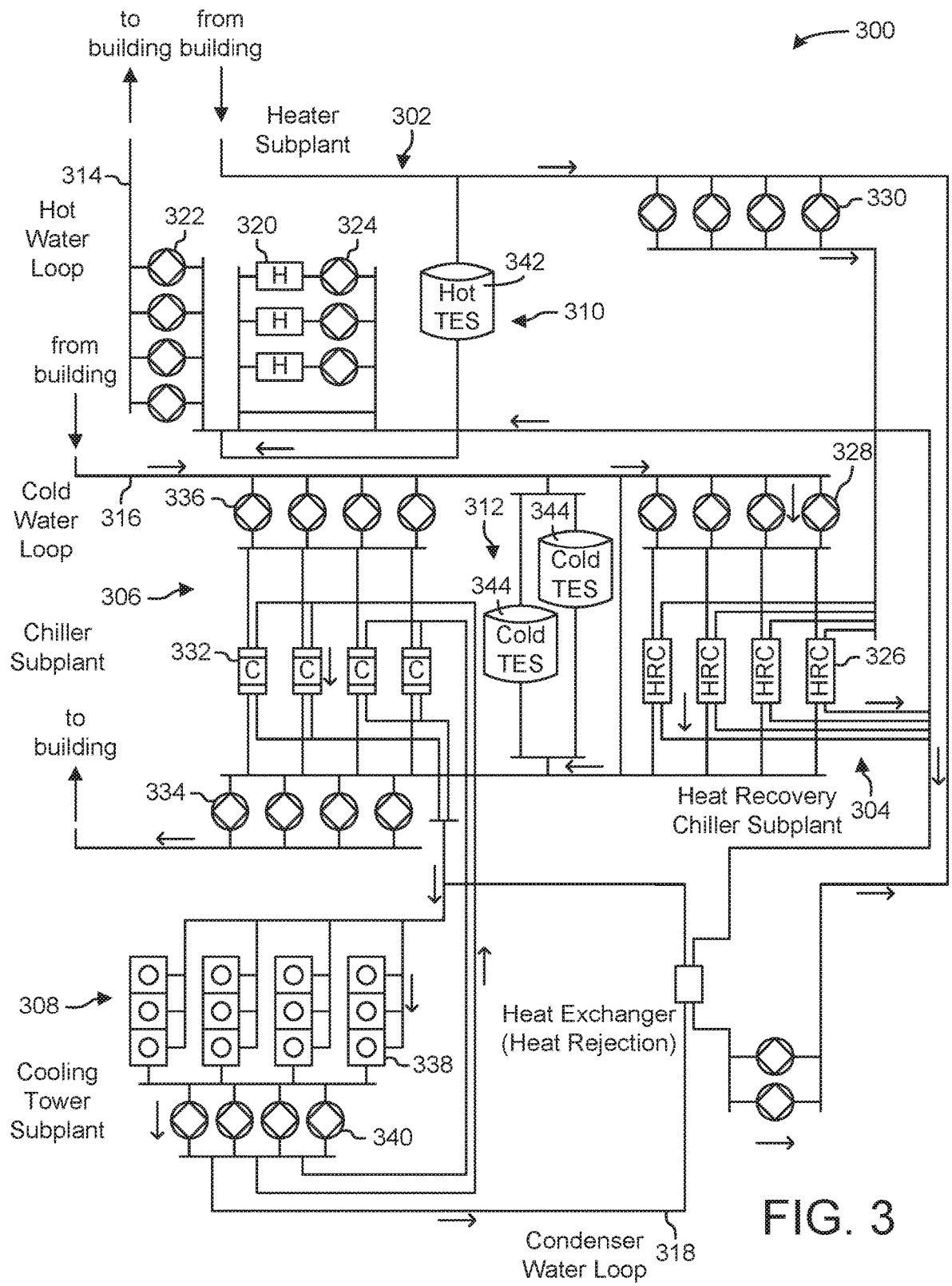
FIG. 3 is a block diagram of a waterside system of a building, according to an exemplary embodiment.
Figure 4:
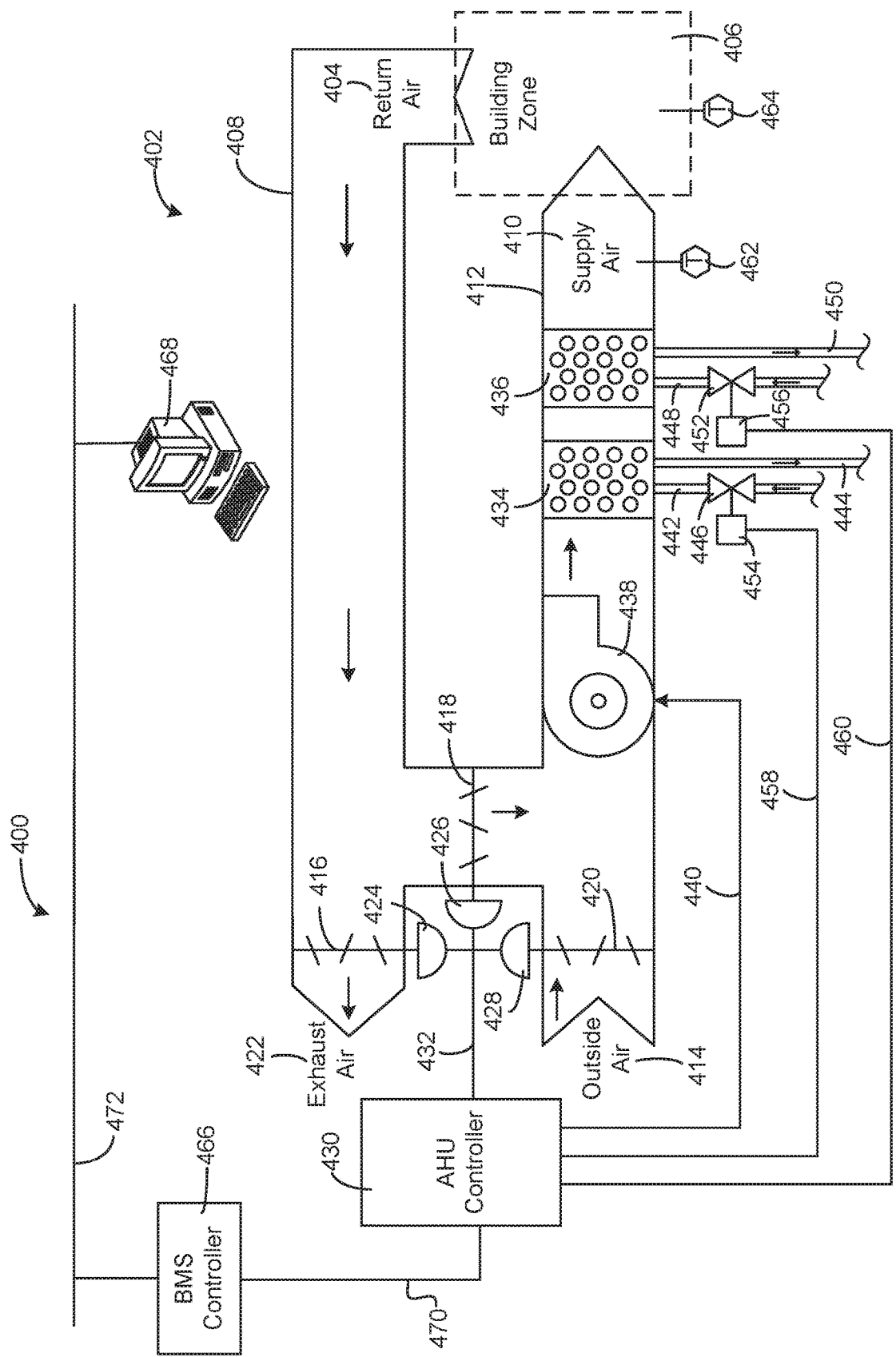
FIG. 4 is a block diagram of an airside system of a building, according to an exemplary embodiment.

Referring now to FIGS. 2-4, several building management systems (BMS) and HVAC systems in which the systems and methods of the present disclosure can be implemented are shown, according to some embodiments. In brief overview, FIG. 2 shows a building 10 equipped with, for example, a HVAC system 200. Building 10 may any suitable building that is communicatively connected to building system 100. FIG. 3 is a block diagram of a waterside system 300 which can be used to serve building 10. FIG. 4 is a block diagram of an airside system 400 which can be used to serve building 10. Any of the building equipment of HVAC system 200, waterside system 300, and/or airside system 400 and/or controllers thereof may act as the edge devices of the building system 100.

Building and HVAC System

Referring particularly to FIG. 2, a perspective view of a smart building 10 is shown. Building 10 is served by a BMS (e.g., building system 100). A BMS is, in general, a system of devices configured to control, monitor, and manage equipment in or around a building or building area. A BMS can include, for example, a HVAC system, a security system, a lighting system, a fire alerting system, and any other system that is capable of managing building functions or devices, or any combination thereof. Further, each of the systems may include sensors and other devices (e.g., IoT devices) for the proper operation, maintenance, monitoring, and the like of the respective systems.

The BMS that serves building 10 includes a HVAC system 200. HVAC system 200 can include HVAC devices (e.g., heaters, chillers, air handling units, pumps, fans, thermal energy storage, etc.) configured to provide heating, cooling, ventilation, or other services for building 10. For example, HVAC system 200 is shown to include a waterside system 220 and an airside system 230. Waterside system 220 may provide a heated or chilled fluid to an air handling unit of airside system 230. Airside system 230 may use the heated or chilled fluid to heat or cool an airflow provided to building 10. An exemplary waterside system and airside system which can be used in HVAC system 200 are described in greater detail with reference to FIGS. 3 and 4.

HVAC system 200 is shown to include a chiller 202, a boiler 204, and a rooftop air handling unit (AHU) 206. Waterside system 220 may use boiler 204 and chiller 202 to heat or cool a working fluid (e.g., water, glycol, etc.) and may circulate the working fluid to AHU 206. In various embodiments, the HVAC devices of waterside system 220 can be located in or around building 10 (as shown in FIG. 2) or at an offsite location such as a central plant (e.g., a chiller plant, a steam plant, a heat plant, etc.). The working fluid can be heated in boiler 204 or cooled in chiller 202, depending on whether heating or cooling is required in building 10. Boiler 204 may add heat to the circulated fluid, for example, by burning a combustible material (e.g., natural gas) or using an electric heating element. Chiller 202 may place the circulated fluid in a heat exchange relationship with another fluid (e.g., a refrigerant) in a heat exchanger (e.g., an evaporator) to absorb heat from the circulated fluid. The working fluid from chiller 202 and/or boiler 204 can be transported to AHU 206 via piping 208.

AHU 206 may place the working fluid in a heat exchange relationship with an airflow passing through AHU 206 (e.g., via one or more stages of cooling coils and/or heating coils). The airflow can be, for example, outside air, return air from within building 10, or a combination of both. AHU 206 may transfer heat between the airflow and the working fluid to provide heating or cooling for the airflow. For example, AHU 206 can include one or more fans or blowers configured to pass the airflow over or through a heat exchanger containing the working fluid. The working fluid may then return to chiller 202 or boiler 204 via piping 210.

Airside system 230 may deliver the airflow supplied by AHU 206 (i.e., the supply airflow) to building 10 via air supply ducts 212 and may provide return air from building 10 to AHU 206 via air return ducts 214. In some embodiments, airside system 230 includes multiple variable air volume (VAV) units 216. For example, airside system 230 is shown to include a separate VAV unit 216 on each floor or zone of building 10. VAV units 216 can include dampers or other flow control elements that can be operated to control an amount of the supply airflow provided to individual zones of building 10. In other embodiments, airside system 230 delivers the supply airflow into one or more zones of building 10 (e.g., via supply ducts 212) without using intermediate VAV units 216 or other flow control elements. AHU 206 can include various sensors (e.g., temperature sensors, pressure sensors, etc.) configured to measure attributes of the supply airflow. AHU 206 may receive input from sensors located within AHU 206 and/or within the building zone and may adjust the flow rate, temperature, or other attributes of the supply airflow through AHU 206 to achieve setpoint conditions for the building zone.

Waterside System

Referring now to FIG. 3, a block diagram of a waterside system 300 is shown, according to some embodiments. In various embodiments, waterside system 300 may supplement or replace waterside system 220 in HVAC system 200 or can be implemented separate from HVAC system 200. When implemented in HVAC system 200, waterside system 300 can include a subset of the HVAC devices in HVAC system 200 (e.g., boiler 204, chiller 202, pumps, valves, etc.) and may operate to supply a heated or chilled fluid to AHU 206. The HVAC devices of waterside system 300 can be located within building 10 (e.g., as components of waterside system 220) or at an offsite location such as a central plant.

In FIG. 3, waterside system 300 is shown as a central plant having subplants 302-312. Subplants 302-312 are shown to include a heater subplant 302, a heat recovery chiller subplant 304, a chiller subplant 306, a cooling tower subplant 308, a hot thermal energy storage (TES) subplant 310, and a cold thermal energy storage (TES) subplant 312. Subplants 302-312 consume resources (e.g., water, natural gas, electricity, etc.) from utilities to serve thermal energy loads (e.g., hot water, cold water, heating, cooling, etc.) of a building or campus. For example, heater subplant 302 can be configured to heat water in a hot water loop 314 that circulates the hot water between heater subplant 302 and building 10. Chiller subplant 306 can be configured to chill water in a cold water loop 316 that circulates the cold water between chiller subplant 306 and building 10. Heat recovery chiller subplant 304 can be configured to transfer heat from cold water loop 316 to hot water loop 314 to provide additional heating for the hot water and additional cooling for the cold water. Condenser water loop 318 may absorb heat from the cold water in chiller subplant 306 and reject the absorbed heat in cooling tower subplant 308 or transfer the absorbed heat to hot water loop 314. Hot TES subplant 310 and cold TES subplant 312 may store hot and cold thermal energy, respectively, for subsequent use.

Hot water loop 314 and cold water loop 316 may deliver the heated and/or chilled water to air handlers located on the rooftop of building 10 (e.g., AHU 206) or to individual floors or zones of building 10 (e.g., VAV units 216). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 302-312 to receive further heating or cooling.

Although subplants 302-312 are shown and described as heating and cooling water for circulation to a building, it is understood that any other type of working fluid (e.g., glycol, CO2, etc.) can be used in place of or in addition to water to serve thermal energy loads. In other embodiments, subplants 302-312 may provide heating and/or cooling directly to the building or campus without requiring an intermediate heat transfer fluid. These and other variations to waterside system 300 are within the teachings of the present disclosure.

Each of subplants 302-312 can include a variety of equipment configured to facilitate the functions of the subplant. For example, heater subplant 302 is shown to include heating elements 320 (e.g., boilers, electric heaters, etc.) configured to add heat to the hot water in hot water loop 314. Heater subplant 302 is also shown to include several pumps 322 and 324 configured to circulate the hot water in hot water loop 314 and to control the flow rate of the hot water through individual heating elements 320. Chiller subplant 306 is shown to include chillers 332 configured to remove heat from the cold water in cold water loop 316. Chiller subplant 306 is also shown to include several pumps 334 and 336 configured to circulate the cold water in cold water loop 316 and to control the flow rate of the cold water through individual chillers 332.

Heat recovery chiller subplant 304 is shown to include heat recovery heat exchangers 326 (e.g., refrigeration circuits) configured to transfer heat from cold water loop 316 to hot water loop 314. Heat recovery chiller subplant 304 is also shown to include several pumps 328 and 330 configured to circulate the hot water and/or cold water through heat recovery heat exchangers 326 and to control the flow rate of the water through individual heat recovery heat exchangers 326. Cooling tower subplant 308 is shown to include cooling towers 338 configured to remove heat from the condenser water in condenser water loop 318. Cooling tower subplant 308 is also shown to include several pumps 340 configured to circulate the condenser water in condenser water loop 318 and to control the flow rate of the condenser water through individual cooling towers 338.

Hot TES subplant 310 is shown to include a hot TES tank 342 configured to store the hot water for later use. Hot TES subplant 310 may also include one or more pumps or valves configured to control the flow rate of the hot water into or out of hot TES tank 342. Cold TES subplant 312 is shown to include cold TES tanks 344 configured to store the cold water for later use. Cold TES subplant 312 may also include one or more pumps or valves configured to control the flow rate of the cold water into or out of cold TES tanks 344.

In some embodiments, one or more of the pumps in waterside system 300 (e.g., pumps 322, 324, 328, 330, 334, 336, and/or 340) or pipelines in waterside system 300 include an isolation valve associated therewith. Isolation valves can be integrated with the pumps or positioned upstream or downstream of the pumps to control the fluid flows in waterside system 300. In various embodiments, waterside system 300 can include more, fewer, or different types of devices and/or subplants based on the particular configuration of waterside system 300 and the types of loads served by waterside system 300.

Airside System

Referring now to FIG. 4, a block diagram of an airside system 400 is shown, according to some embodiments. In various embodiments, airside system 400 may supplement or replace airside system 230 in HVAC system 200 or can be implemented separate from HVAC system 200. When implemented in HVAC system 200, airside system 400 can include a subset of the HVAC devices in HVAC system 200 (e.g., AHU 206, VAV units 216, ducts 212-214, fans, dampers, etc.) and can be located in or around building 10. Airside system 400 may operate to heat or cool an airflow provided to building 10 using a heated or chilled fluid provided by waterside system 300.

In FIG. 4, airside system 400 is shown to include an economizer-type air handling unit (AHU) 402. Economizer-type AHUs vary the amount of outside air and return air used by the air handling unit for heating or cooling. For example, AHU 402 may receive return air 404 from building zone 406 via return air duct 408 and may deliver supply air 410 to building zone 406 via supply air duct 412. In some embodiments, AHU 402 is a rooftop unit located on the roof of building 10 (e.g., AHU 206 as shown in FIG. 2) or otherwise positioned to receive both return air 404 and outside air 414. AHU 402 can be configured to operate exhaust air damper 416, mixing damper 418, and outside air damper 420 to control an amount of outside air 414 and return air 404 that combine to form supply air 410. Any return air 404 that does not pass through mixing damper 418 can be exhausted from AHU 402 through exhaust damper 416 as exhaust air 422.

Each of dampers 416-420 can be operated by an actuator. For example, exhaust air damper 416 can be operated by actuator 424, mixing damper 418 can be operated by actuator 426, and outside air damper 420 can be operated by actuator 428. Actuators 424-428 may communicate with an AHU controller 430 via a communications link 432. Actuators 424-428 may receive control signals from AHU controller 430 and may provide feedback signals to AHU controller 430. Feedback signals can include, for example, an indication of a current actuator or damper position, an amount of torque or force exerted by the actuator, diagnostic information (e.g., results of diagnostic tests performed by actuators 424-428), status information, commissioning information, configuration settings, calibration data, and/or other types of information or data that can be collected, stored, or used by actuators 424-428. AHU controller 430 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 424-428.

Still referring to FIG. 4, AHU 304 is shown to include a cooling coil 434, a heating coil 436, and a fan 438 positioned within supply air duct 412. Fan 438 can be configured to force supply air 410 through cooling coil 434 and/or heating coil 436 and provide supply air 410 to building zone 406. AHU controller 430 may communicate with fan 438 via communications link 440 to control a flow rate of supply air 410. In some embodiments, AHU controller 430 controls an amount of heating or cooling applied to supply air 410 by modulating a speed of fan 438.

Cooling coil 434 may receive a chilled fluid from waterside system 300 (e.g., from cold water loop 316) via piping 442 and may return the chilled fluid to waterside system 300 via piping 444. Valve 446 can be positioned along piping 442 or piping 444 to control a flow rate of the chilled fluid through cooling coil 434. In some embodiments, cooling coil 434 includes multiple stages of cooling coils that can be independently activated and deactivated (e.g., by AHU controller 430, etc.) to modulate an amount of cooling applied to supply air 410.

Heating coil 436 may receive a heated fluid from waterside system 300 (e.g., from hot water loop 314) via piping 448 and may return the heated fluid to waterside system 300 via piping 450. Valve 452 can be positioned along piping 448 or piping 450 to control a flow rate of the heated fluid through heating coil 436. In some embodiments, heating coil 436 includes multiple stages of heating coils that can be independently activated and deactivated (e.g., by AHU controller 430, etc.) to modulate an amount of heating applied to supply air 410.

Each of valves 446 and 452 can be controlled by an actuator. For example, valve 446 can be controlled by actuator 454 and valve 452 can be controlled by actuator 456. Actuators 454-456 may communicate with AHU controller 430 via communications links 458-460. Actuators 454-456 may receive control signals from AHU controller 430 and may provide feedback signals to controller 430. In some embodiments, AHU controller 430 receives a measurement of the supply air temperature from a temperature sensor 462 positioned in supply air duct 412 (e.g., downstream of cooling coil 434 and/or heating coil 436). AHU controller 430 may also receive a measurement of the temperature of building zone 406 from a temperature sensor 464 located in building zone 406.

In some embodiments, AHU controller 430 operates valves 446 and 452 via actuators 454-456 to modulate an amount of heating or cooling provided to supply air 410 (e.g., to achieve a setpoint temperature for supply air 410 or to maintain the temperature of supply air 410 within a setpoint temperature range). The positions of valves 446 and 452 affect the amount of heating or cooling provided to supply air 410 by cooling coil 434 or heating coil 436 and may correlate with the amount of energy consumed to achieve a desired supply air temperature. AHU controller 430 may control the temperature of supply air 410 and/or building zone 406 by activating or deactivating coils 434-436, adjusting a speed of fan 438, or a combination of both.

Still referring to FIG. 4, airside system 400 is shown to include a building management system (BMS) controller 466 and a client device 468. BMS controller 466 can include one or more computer systems (e.g., servers, supervisory controllers, subsystem controllers, etc.) that serve as system level controllers, application or data servers, head nodes, or master controllers for airside system 400, waterside system 300, HVAC system 200, and/or other controllable systems that serve building 10. BMS controller 466 may communicate with multiple downstream building systems or subsystems (e.g., HVAC system 200, a security system, a lighting system, waterside system 300, etc.) via a communications link 470 according to like or disparate protocols (e.g., LON, BACnet, etc.). In various embodiments, AHU controller 430 and BMS controller 466 can be separate (as shown in FIG. 4) or integrated. In an integrated implementation, AHU controller 430 can be a software module configured for execution by a processor of BMS controller 466.

In some embodiments, AHU controller 430 receives information from BMS controller 466 (e.g., commands, setpoints, operating boundaries, etc.) and provides information to BMS controller 466 (e.g., temperature measurements, valve or actuator positions, operating statuses, diagnostics, etc.). For example, AHU controller 430 may provide BMS controller 466 with temperature measurements from temperature sensors 462-464, equipment on/off states, equipment operating capacities, and/or any other information that can be used by BMS controller 466 to monitor or control a variable state or condition within building zone 406.

Client device 468 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 200, its subsystems, and/or devices. Client device 468 can be a computer workstation, a client terminal, a remote or local interface, or any other type of user interface device. Client device 468 can be a stationary terminal or a mobile device. For example, client device 468 can be a desktop computer, a computer server with a user interface, a laptop computer, a tablet, a smartphone, a PDA, or any other type of mobile or non-mobile device. Client device 468 may communicate with BMS controller 466 and/or AHU controller 430 via communications link 472.

Device Arrangement

Figure 5:
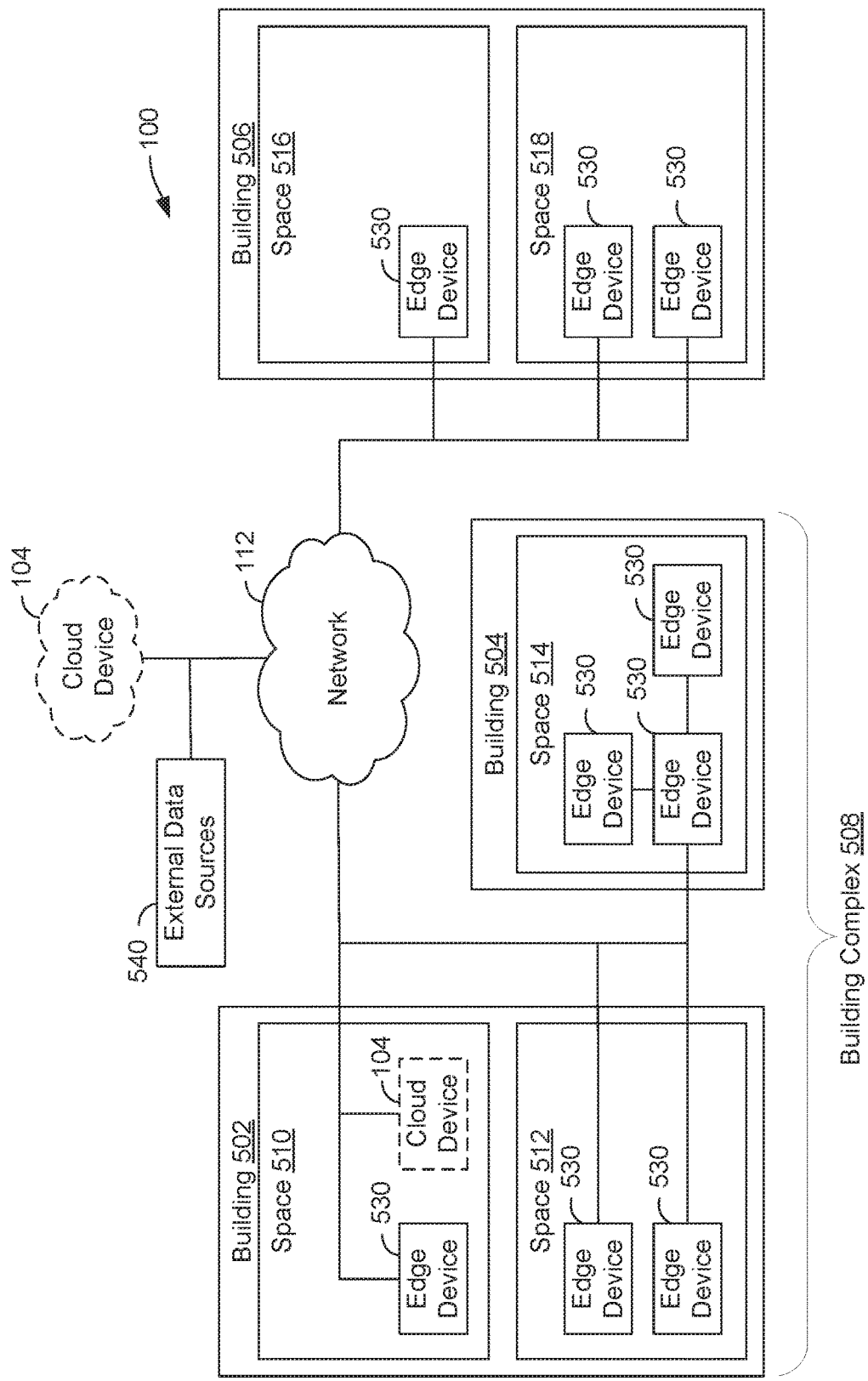
FIG. 5 is a block diagram of a building management system, according to an exemplary embodiment.

Referring now to FIG. 5, building system 100 is shown implemented throughout a series of buildings, according to some embodiments. Specifically, the building system 100 is shown being implemented within a building 502, a building 504, and a building 506. One or more of the buildings 502, 504, and 506 may be building 10. Building 502 and building 504 are both part of a building campus or building complex, shown as building complex 508. As used herein, the term "building complex" refers to a group of buildings that are interconnected and/or otherwise related (e.g., that are commonly owned, that serve a common purpose). By way of example, building 502 and building 504 may both be part of the same apartment complex. By way of another example, building 502 and building 504 may both be part of a college campus. Building 506 may not be part of building complex 508. By way of example, building 506 may be separated from building 502 and building 504. By way of another example, building 506 may not be related to building 502 or building 504 (e.g., building 502 and building 504 may be a stadium and an interconnected convention center, and building 506 may be a separately-owned restaurant located adjacent the stadium). In other embodiments, the building system 100 is implemented within more, fewer, or alternative buildings.

Buildings 502, 504, and 506 may include a variety of different building types. Buildings 502, 504, and 506 may include homes, apartment buildings, schools, hospitals, factories, office buildings, warehouses, military installations, stadiums, shopping malls, grocery stores, or other types of buildings. In some embodiments, buildings 502, 504, and 506 are all similar types of buildings. In other embodiments, one or more of buildings 502, 504, and 506 are different types of buildings (e.g., a factory vs an office building, etc.).

As shown in FIG. 5, building 502 includes two rooms or defined areas, shown as spaces 510 and 512. Similarly, building 504 is shown to include a single space 514, and building 506 is shown to include two spaces 516 and 518. In other embodiments, buildings 502, 504, and/or 506 include more or fewer rooms. Spaces 510, 512, 514, 516, and 518 may be indoor spaces (e.g., bedrooms, offices, bathrooms, operating rooms, factory floors, etc.) or outdoor spaces (e.g., balconies, patios, stadiums, parking lots, etc.). In some embodiments, spaces 510, 512, 514, 516, and/or 518 are subdivisions of a larger space (e.g., a section of a factory floor, a seating section of a gymnasium, a hallway connected to a larger room, etc.). In other embodiments, spaces 510, 512, 514, 516, and/or 518 are discrete spaces.

As shown in FIG. 5, spaces 510, 512, 514, 516, and 518 are each associated with one or more edge devices 530. Edge devices 530 may be any of the various edge devices described herein (e.g., one of the edge devices shown in FIG. 1, the edge device 700 shown in FIG. 7, etc.). Edge devices 530 may be located within the associated spaces. Additionally or alternatively, edge devices 530 may affect one or more characteristics of the associated spaces. In other embodiments, spaces 510, 512, 514, 516, and/or 518 are associated with more or fewer edge devices 530.

Referring again to FIG. 5, the edge devices 530 are shown in communication with cloud device 104 through network 112. FIG. 5 illustrates two different potential placements of cloud device 104. In some embodiments, cloud device 104 is an off-site device that is located remote from buildings 502, 504, and 506. By way of example, cloud device 104 may include one or more cloud servers located within a remote datacenter. In other embodiments, cloud device 104 is an on-site device that is located within one or more of spaces 510, 512, 514, 516, or 518. By way of example, FIG. 5 illustrates cloud device 104 within space 510. By way of another example, cloud device 104 may be distributed between multiple spaces.

As shown in FIG. 5, some of edge devices 530, such as edge devices 530 of space 512, communicate directly with cloud device 104 through network 112. Other edge devices 530, such as edge devices 530 of space 514, may communicate with cloud device 104 indirectly through network 112 and one or more edge devices 530. In such a configuration, one or more edge devices 530 may pass information (e.g., data, commands, etc.) therethrough to facilitate such indirect communication. It should be understood however, that these edge devices 530 would not necessarily be considered intermediate control devices, as these edge devices 530 may simply be transferring the information, not processing the information to generate a command for the subsequent edge device 530.

As shown in FIG. 5, cloud device 104 and/or edge devices 530 can be configured to communicate with one or more external data sources 540. The external data sources 540 may include various types of data sources configured to provide various types of external data. The external data may be data that is difficult to observe using edge devices 530 or data that would otherwise be unavailable to edge devices 530. By way of example, external data source 540 may include a weather service configured to provide weather data. By way of another example, external data source 540 may include a news service configured to provide news data.

By way of another example, external data source 540 may include $3^{rd}$ party software that manages schedules of one or more users within building system 100 (e.g., indicating how many occupants will occupy a given space at a given time). By way of another example, external data source 540 may include a traffic monitor that provides external data relating to traffic conditions. The external data may include occupancy data such as the amount of people attending a meeting and where the meeting will be located. Cloud device 104 and/or edge devices 530 can communicate with external data sources 540 directly through network 112. In other embodiments, external data sources 540 are omitted.

Cloud Device

Figure 6:
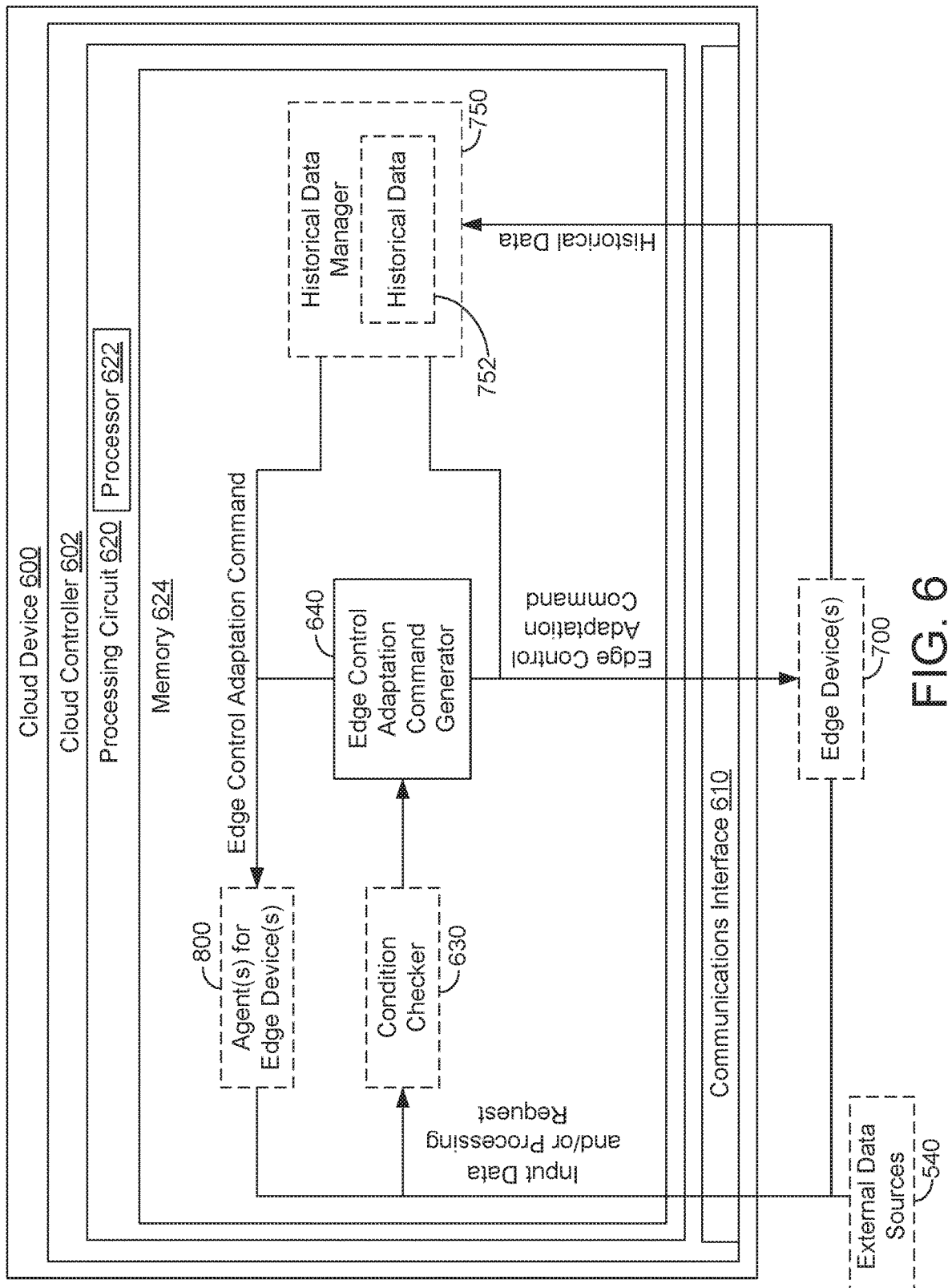
FIG. 6 is a block diagram of a cloud device of a building management system, according to an exemplary embodiment.

Referring now to FIG. 6, a block diagram a cloud device 600 of a building system (e.g., building system 100) is shown, according to some embodiments. In some embodiments, cloud device 600 is the cloud device 104 of FIG. 1. As shown in FIG. 6, a cloud controller 602 is implemented within cloud device 600. Cloud controller 602 may be a hardware-defined controller or a software-defined controller. In some embodiments, cloud device 600 includes a single device (e.g., one server, one housing, etc.), and cloud controller 602 is implemented on the single device. In various other embodiments, cloud device 600 includes multiple devices (e.g., that can exist in distributed locations), and cloud controller 602 is distributed across the multiple devices. In yet other embodiments, cloud device 600 is omitted, and cloud controller 602 is distributed across multiple edge devices.

Cloud controller 602 is shown to include a communications interface 610. Interface 610 may facilitate communications between cloud controller 602 and sources or receivers of information outside of cloud controller 602. As shown in FIG. 6, communications interface 610 is configured to communicate with one or more external data sources 540 and edge devices 700 (e.g., the edge device 700 shown in FIG. 7). In other embodiments, communications interface 610 is configured to communicate with more, fewer, or alternative devices (e.g., intermediate control device 108).

Interface 610 can be or include wired or wireless communications interfaces (e.g., jacks, antennas, transmitters, receivers, transceivers, wire terminals, etc.) for conducting data communications with external data sources 540 and edge devices 700. In various embodiments, communications via interface 610 can be direct (e.g., local wired or wireless communications) or via a communications network (e.g., network 112, which may include a WAN, the Internet, a cellular network, etc.). For example, interface 610 can include an Ethernet card and port for sending and receiving data via an Ethernet-based communications link or network. In another example, interface 610 can include a Wi-Fi transceiver for communicating via a wireless communications network. In another example, interface 610 can include cellular or mobile phone communications transceivers. In another example, interface 610 can include a power line communications interface.

Still referring to FIG. 6, cloud controller 602 is shown to include a processing circuit 620 including a processor 622 and a memory 624. Processing circuit 620 can be communicably connected to interface 610 such that processing circuit 620 and the various components thereof can send and receive data via interface 610. Processor 622 can be implemented as a general purpose processor, an application specific integrated circuit (ASIC), one or more field programmable gate arrays (FPGAs), a group of processing components, or other suitable electronic processing components.

Memory 624 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 624 can be or include volatile memory or non-volatile memory. Memory 624 can include database components, object code components, script components, or any other type of information structure for supporting the various activities and information structures described in the present application. According to some embodiments, memory 624 is communicably connected to processor 622 via processing circuit 620 and includes computer code for executing (e.g., by processing circuit 620 and/or processor 622) one or more processes described herein.

Referring to FIG. 6, memory 624 can include a module, shown as condition checker 630. Condition checker 630 can be configured to analyze input data provided by external data sources 540 and/or edge devices 700 and determine if the input data should be processed by the edge controller 702 or if the cloud device 600 should process the input data. Specifically, condition checker 630 can determine if a series of local processing conditions are met by the input data. If all of the local processing conditions are met, then the condition checker 630 may permit the input data to be processed by edge controller 702. If one or more of the local processing conditions are not met, then cloud controller 602 may process the input data.

Referring again to FIG. 6, memory 624 can include a module, shown as edge control adaptation command generator 640. Edge control adaptation command generator 640 may be configured to analyze the input data provided by the edge devices 700 to determine if a local control scheme (e.g., local control scheme 730) of an edge device 700 should be modified. If edge control adaptation command generator determines that the local control scheme should be modified, edge control adaptation command generator generates an edge control adaptation command for edge controller 702 outlining the changes to the local control scheme.

Edge Device

Figure 7:
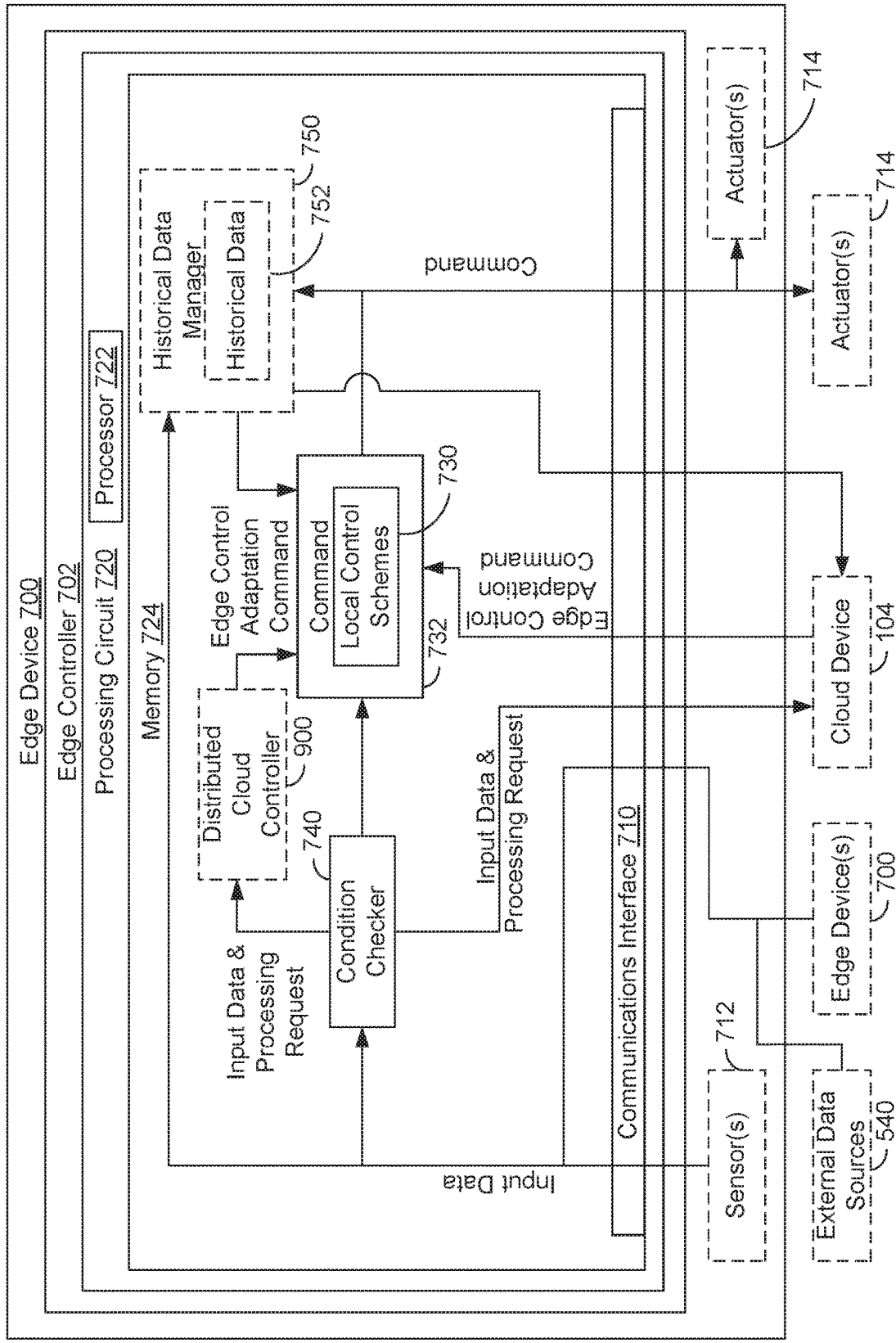
FIG. 7 is a block diagram of an edge device of a building management system, according to an exemplary embodiment

Referring now to FIG. 7, a block diagram of an edge device 700 of a building system (e.g., building system 100) is shown, according to some embodiments. Edge device 700 may be and/or include any of the edge devices shown in FIG. 1 and/or any of edge devices 530 of FIG. 5. As shown in FIG. 7, an edge controller 702 is implemented within edge device 700. Edge controller 702 may be a hardware-defined controller or a software-defined controller. In some embodiments, edge controller 702 is implemented locally within edge device 700. In other embodiments, edge controller 702 is a software-defined controller implemented within cloud device 600.

Edge controller 702 is shown to include a communications interface 710. Interface 710 may facilitate communications between edge controller 702 and sources or receivers of information outside of edge controller 702 (e.g., within edge device 700, outside of edge device 700, etc.). As shown in FIG. 7, communications interface 710 is configured to communicate with one or more sensors 712, external data sources 540, other edge devices 700, cloud device 600, and one or more actuators 714. In other embodiments, communications interface 710 is configured to communicate with more, fewer, or alternative devices (e.g., intermediate control device 108).

Interface 710 can be or include wired or wireless communications interfaces (e.g., jacks, antennas, transmitters, receivers, transceivers, wire terminals, etc.) for conducting data communications with sensors 712, external data sources 540, other edge devices 700, cloud device 104, and/or actuators 714. In various embodiments, communications via interface 710 can be direct (e.g., local wired or wireless communications) or via a communications network (e.g., network 112, which may include a WAN, the Internet, a cellular network, etc.). For example, interface 710 can include an Ethernet card and port for sending and receiving data via an Ethernet-based communications link or network. In another example, interface 710 can include a Wi-Fi transceiver for communicating via a wireless communications network. In another example, interface 710 can include cellular or mobile phone communications transceivers. In another example, interface 710 can include a power line communications interface.

Edge device 700 may include and/or communicate with one or more sensors 712. Although FIG. 7 illustrates sensors 712 within edge device 700, it should be understood that sensors 712 may additionally or alternatively be located outside of edge device 700. Sensors 712 may be configured to provide sensor data to edge controller 702. Sensor data may relate to a characteristic of the space associated with edge device 700. Edge controller 702 can then use the sensor data to determine one or more commands to send to actuators 714. Edge controller 702 may additionally or alternatively provide the sensor data to one or more other devices of building system 100 (e.g., other edge devices 700, cloud device 104, etc.). Sensors 712 can include, but are not limited to, cameras, acoustic sensors, sound sensors, vibration sensors, automotive or transportation sensors, chemical sensors, electric current sensors, electric voltage sensors, magnetic sensors, radio sensors, environment sensors, weather sensors, moisture sensors, humidity sensors, flow sensors, fluid velocity sensors, ionizing radiation sensors, subatomic particle sensors, navigation instruments, position sensors, angle sensors, displacement sensors, distance sensors, speed sensors, acceleration sensors, optical sensors, light sensors, imaging devices, photon sensors, pressure sensors, force sensors, density sensors, level sensors, thermal sensors, heat sensors, temperature sensors, proximity sensors, presence sensors, and/or any other type of sensors or sensing systems.

Edge device 700 may include and/or communicate with one or more actuators 714. Actuators 714 may be located within or outside of edge device 700. Actuators 714 may include any device that, in response to a command from edge controller 702, performs some action. This action may directly or indirectly affect one or more characteristics of the space associated with edge device 700. Actuators 714 can include any of the components controlled by the edge devices described with respect to FIG. 1 (e.g., an LED controlled by lighting controller 122, an activation element of electronic sprinkler 136, a motor of printer 153, etc.). Actuators 714 can include any of the components of HVAC system 200, waterside system 300, or airside system 400 (e.g., dampers, heaters, chillers, etc.). Actuators 714 can include, but are not limited to, motors, relays, lights (e.g., LEDs, incandescent bulbs, etc.), pumps, compressors, solenoids, speakers, screens (e.g., LCD screens), and projectors.

Still referring to FIG. 7, edge controller 702 is shown to include a processing circuit 720 including a processor 722 and a memory 724. Processing circuit 720 can be communicably connected to interface 710 such that processing circuit 720 and the various components thereof can send and receive data via interface 710. Processor 722 can be implemented as a general purpose processor, an application specific integrated circuit (ASIC), one or more field programmable gate arrays (FPGAs), a group of processing components, or other suitable electronic processing components.

Memory 724 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 724 can be or include volatile memory or non-volatile memory. Memory 724 can include database components, object code components, script components, or any other type of information structure for supporting the various activities and information structures described in the present application. According to some embodiments, memory 724 is communicably connected to processor 722 via processing circuit 720 and includes computer code for executing (e.g., by processing circuit 720 and/or processor 722) one or more processes described herein.

Memory 724 is shown to store control logic, shown as local control scheme 730. Local control scheme 730 determines how edge controller 702 operates. Local control scheme 730 can control what devices (e.g., other edge devices 700, external data sources 740, etc.) edge controller 702 retrieves input data from. Local control scheme 730 can control how edge controller 702 responds to certain input data (e.g., what commands edge controller 702 provides to actuators 714 based on the input data received, control logic that determines the commands, etc.). Local control scheme 730 can vary over time. Local control scheme 730 can be varied by one or more modules of edge controller 702. Local control scheme 730 can be varied based on one or more edge control adaptation commands (e.g., received from cloud controller 602).

As shown in FIG. 7, local control scheme 730 is utilized by a module of edge controller 702, shown as command generator 732, to determine a command to provide to actuator 714. Specifically, command generator 732 can receive the input data from one or more devices and, using the local control scheme 730, generate a command for the actuator 714 based on the input data. Command generator 732 may also be configured to modify the local control scheme 730 in response to receiving an edge control adaptation command.

Referring again to FIG. 7, memory 724 can include a module, shown as condition checker 740. Condition checker 740 can be configured to analyze the input data and determine if the input data should be processed locally or if additional processing should be completed by cloud device 600. Specifically, condition checker 740 can determine if a series of local processing conditions are met by the input data. If all of the local processing conditions are met, then the input data may be processed locally. If one or more of the local processing conditions are not met, then condition checker 740 may send a processing request to cloud controller 602.

Referring again to FIG. 7, edge controller 702 can include a module, shown as historical data manager 750. Historical data manager 750 may receive the input data from one or more devices (e.g., the sensors 712, the external data sources 540, other edge devices 700, etc.) and the commands that are sent to the actuators 714 by edge controller 702. Historical data manager 750 records (e.g., generates and stores) historical data 752 using the input data and the commands. Historical data 752 may represent the actions taken by the edge controller 702 and the corresponding effect of the actions on the characteristics of the associated space and/or other information. Using historical data 752, historical data manager 750 may generate one or more edge control adaptation commands to modify local control scheme 730. In some embodiments, cloud controller 602 additionally or alternatively includes a historical data manager 750.

Software Agents and Distributed Cloud Devices

Figure 8:
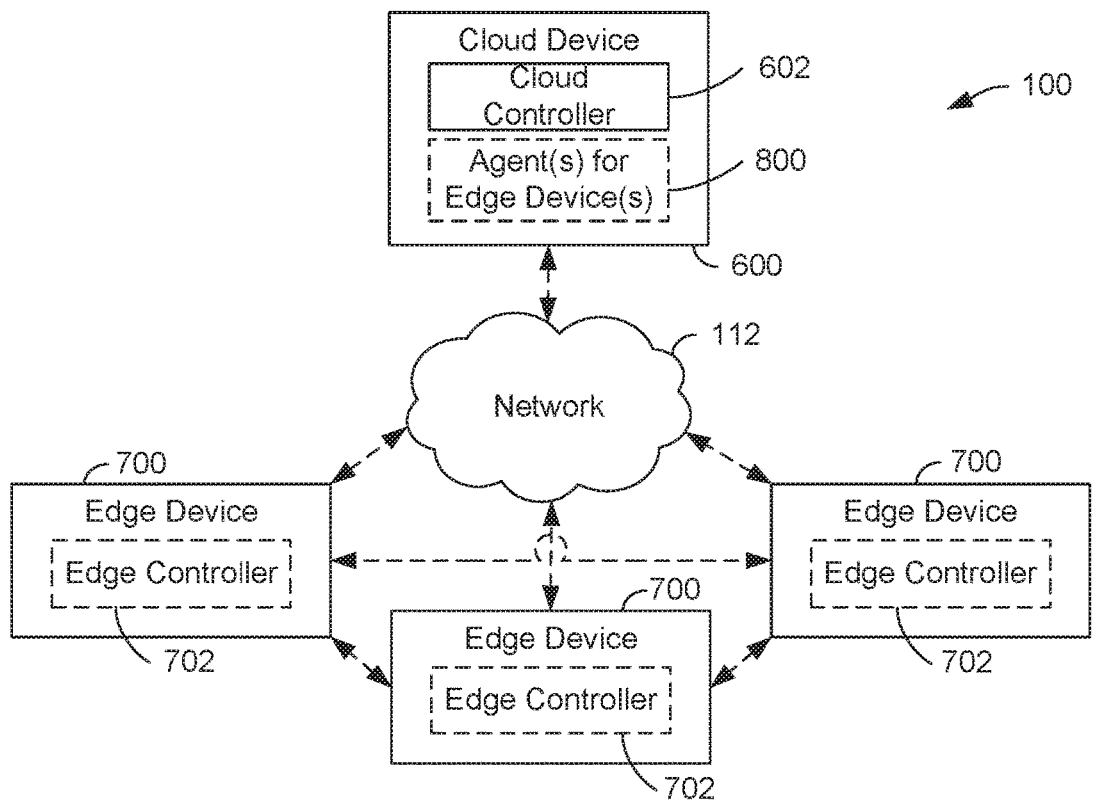
FIG. 8 is a block diagram of a building management system, according to an exemplary embodiment.
Figure 9:
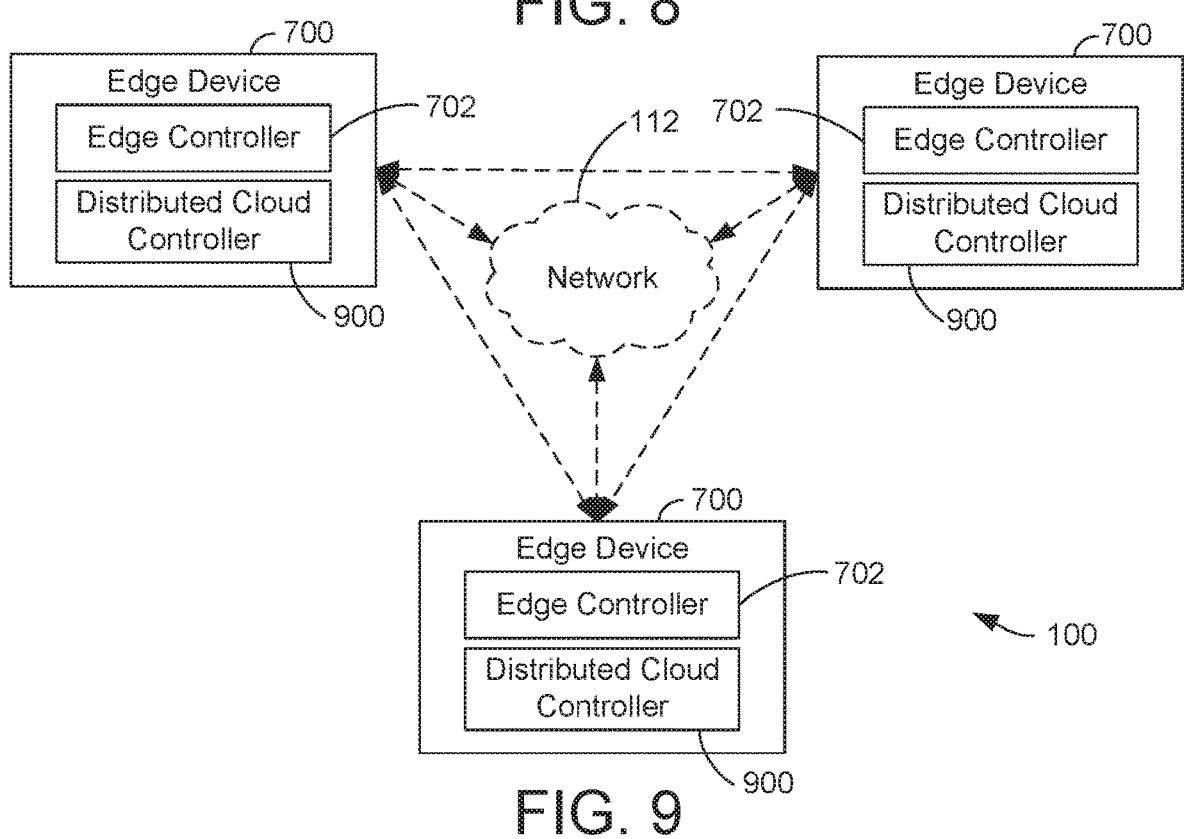
FIG. 9 is a block diagram of a building management system, according to an exemplary embodiment.

FIGS. 8 and 9 illustrate arrangements of building system 100, according to various embodiments. It should be understood that each edge device 700 shown may be associated with the same or different spaces and/or building equipment domains and may affect the same or different characteristics. Referring to FIG. 8, building system 100 is shown to include a cloud device 600 and three edge devices 700. Edge devices 700 can communicate with one another directly or through network 112. Cloud device 600 communicates with edge devices 700 through network 112. In other embodiments, building system 100 includes more or fewer edge devices 700.

In some embodiments, a cloud controller 602 is implemented on cloud device 600, and edge controllers 702 are implemented on each edge device 700. In other embodiments, one or more of edge controllers 702 are software-defined controllers, shown as agents for edge devices 800, implemented within cloud device 600 separate from the corresponding edge device 700. As shown in FIG. 6, agent 800 may be stored within memory 624 of cloud device 600. Agent 800 may perform any and all of the functions described herein as being performed by edge controller 702. Agent 800 may communicate directly with cloud controller 602 within cloud device 600. Once agent 800 determines a command for actuator 714, agent 800 may send the command to edge device 700 over network 112.

In some embodiments, cloud device 600 contains multiple agents 800, each agent 800 corresponding to a different edge device 700. In one example, a single server or other computing device can contain a first agent 800 controlling a first edge device 700, a second agent 800 controlling a second edge device 700, and cloud controller 602. Each edge device 700 may be associated with different spaces and/or different building equipment domains. The first edge device 800 may affect (e.g., control) a first characteristic of a first space. The second edge device 800 may affect (e.g., control) one of (a) a second characteristic of the first space or (b) the first characteristic of a second space.

In some embodiments, cloud controller 602 is a distributed cloud controller that is distributed across two or more devices. By way of example, a first portion of cloud controller 602 (e.g., a first portion of processing circuit 620) may be implemented within a first device (e.g., a first server), and a second portion of cloud controller 602 (e.g., a second portion of processing circuit 620) may be implemented within a second device (e.g., a second server). The first and second portions of cloud controller 602 may be in constant or near-constant communication with one another. Any processing tasks of cloud controller 602 may be divided between a processor of the first device and a processor of the second device. By distributing cloud controller 602, the tasks of cloud controller 602 may be performed by two or more relatively less powerful (e.g., each having less processing power, each having smaller memories, etc.) devices as opposed to a single powerful device, increasing the flexibility of building system 100.

Referring to FIG. 9, building system 100 is shown to include three edge devices 700 implementing a distributed cloud system. Cloud device 600 is omitted from building system 100 of FIG. 9. Edge devices 700 can communicate directly with one another, through one or more intermediate edge devices 700 that transfer the communication, and/or through network 112. In other embodiments, building system 100 includes more or fewer edge devices 700. Each edge device 700 is shown to include both an edge controller 702 and a distributed cloud controller 900. As shown in FIG. 7, distributed cloud controller 900 may be stored within memory 724 of edge device 700. Distributed cloud controllers 900 can each function as a portion of cloud controller 602. Accordingly, any processing tasks that would normally be performed by cloud controller 602 may be instead performed by processors 722 of edge devices 700.

Hybrid Edge-Cloud Control Process

Figure 10:
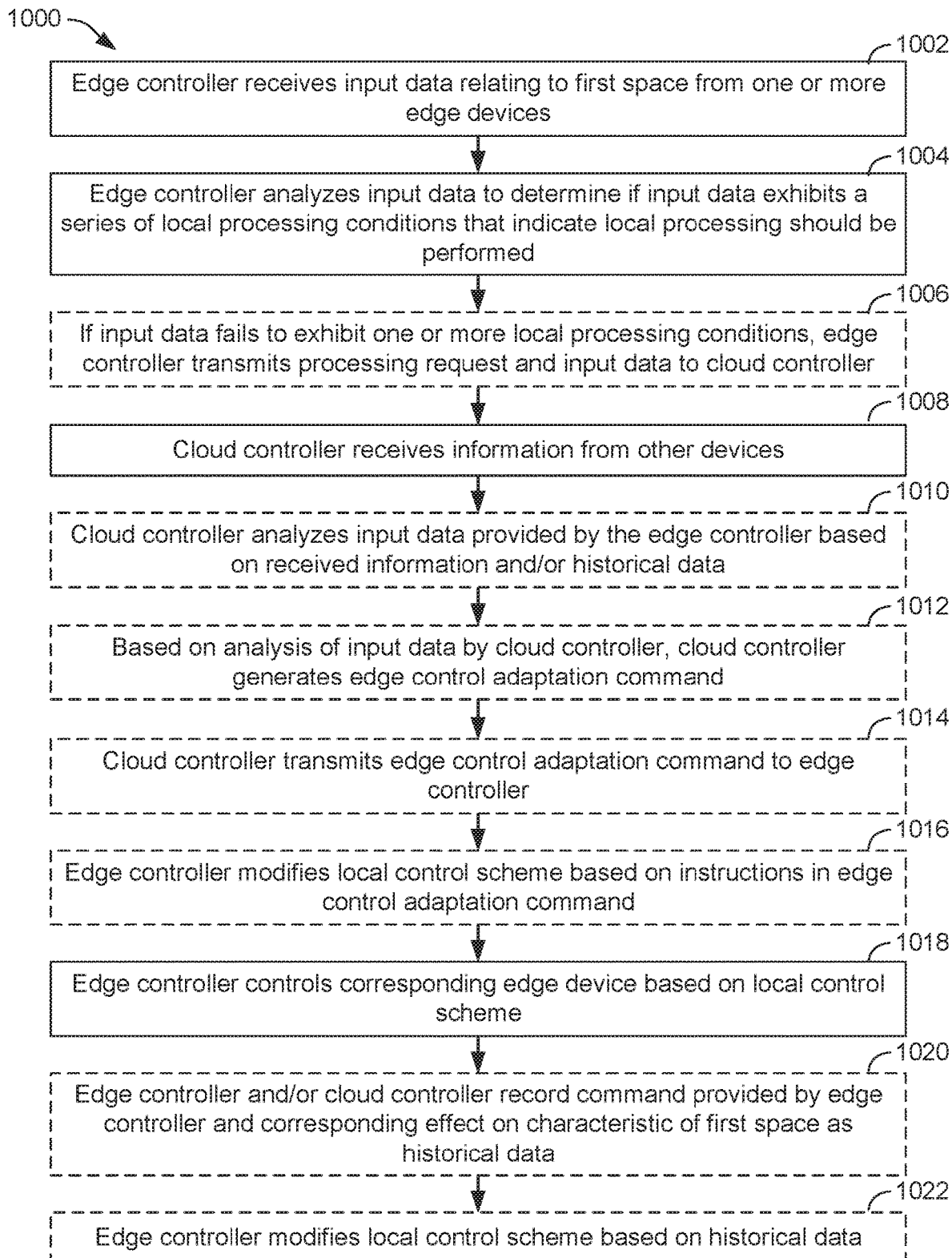
FIG. 10 is a block diagram illustrating a process of controlling building equipment, according to an exemplary embodiment.

Referring to FIG. 10, a process 1000 for controlling building equipment is shown, according to some embodiments. Generally, process 1000 can be used to control the operation of one or more of the edge devices 700 associated with a space. Edge device 700 controlled using process 1000 is configured to affect (e.g., change) a characteristic of the associated space, in some embodiments. Edge controller 702 may be configured to normally operate according to the local control scheme 730. According to local control scheme 730, edge controller 702 can receive input data relating to the first space and analyze the input data locally to determine an appropriate action. In certain circumstances, edge controller 702 can transmit to cloud controller 602 one or both of (a) the input data or (b) a request for cloud controller 602 to analyze the input data. In response to receiving the request, cloud controller 602 can analyze the input data based on information that cloud controller 602 can access. Based on this analysis, cloud controller 602 can generate and transmit an appropriate edge control adaptation command to edge controller 702, and edge controller 702 can operate edge device 700 according to the edge control adaptation command from cloud controller 602. After completion, process 1000 may be continuously repeated to control edge device 700 over time.

Use of cloud controller 602 when determining an action of edge device 700 can have various benefits compared to other control schemes. By way of example, cloud device 600 may have more processing power than edge device 700. Accordingly, cloud device 600 may be able to process large amounts of data more efficiently than edge device 700. By way of another example, cloud device 600 may have access to information that is not normally supplied to edge device 700. Accordingly, cloud device 600 may be able to utilize information related to other spaces or to other building domains to determine an optimal action of edge device 700.

In step 1002, edge controller 702 receives input data relating to a space associated with edge device 700 from one or more sources. In some embodiments, some or all of the input data is sensor data provided by one or more sensors 712 of the edge device 700. In some embodiments, some or all of the input data is provided by one or more other edge devices 700. This input data may include sensor data from one or more sensors 712 of the other edge devices 700 or operational data related to the operation of the other edge devices 700 themselves (e.g., an operational state of the edge device 700). In some embodiments, some or all of the input data is provided by the external data sources 540.

The input data may include any information that relates to the space associated with edge device 700. By way of example, the input data may include sensor data from a sensor 712 that measures a characteristic of the space associated with edge device 700. By way of another example, the input data may include operational data from another edge device 700 relating to an action performed by the other edge device 700 that affects a characteristic of the associated space. In one such example, the other edge device 700 may output light into a space (e.g., from a screen), and the affected characteristic may be a light intensity of the space. In this example, the operational data may be an on/off status of the other edge device 700 or a brightness setting of the other edge device 700.

Referring to FIGS. 7 and 10, in step 1004, edge controller 702 analyzes the input data to determine if the input data exhibits a series of local processing conditions that indicate local processing should be performed. Specifically, edge controller 702 utilizes condition checker 740 to analyze the input data to determine if the input data exhibits all of a series of local processing conditions that indicate the input data should be processed locally. Input data that exhibits all of the local processing conditions may be input data that can be efficiently and accurately be processed by edge controller 702 without edge controller 702 requesting assistance (e.g., additional processing or information) from cloud controller 602. Input data that fails to exhibit one or more of the local processing conditions may benefit from some processing being completed by cloud controller 602. Although some specific examples of local processing conditions are provided herein, condition checker 740 may check if the input data exhibits more, fewer, or alternative local processing conditions in step 1004.

One of the local processing conditions may be based on whether or not the input data conforms to or matches one or more recognized patterns (e.g., stored within condition checker 740) that are recognized by edge controller 702. Specifically, condition checker 740 may compare the input data against the recognized patterns and determine if the input data matches one or more of the recognized patterns. When the input data matches a recognized pattern, this may indicate that edge device 700 and/or a characteristic of the associated space affected by edge device 700 are behaving as expected based on one or more known conditions and that the local processing condition is satisfied.

By way of example, edge device 700 may be a VAV controller (e.g., VAV unit controller 172) that controls a damper to selectively permit heated air to enter the associated space. The input data received by edge device 700 may include a temperature of the associated space (e.g., an air temperature measured by a temperature sensor of edge device 700) and a position of the damper controlled by edge device 700. In a situation where the damper is opened (e.g., permitting a greater flow of heated air into the associated space), the recognized pattern may indicate that the temperature in the space should fall within a temperature range that corresponds to the damper position. If the temperature of the space decreases or if the temperature of the space increases above a maximum expected temperature, the input data may not satisfy the local processing condition. Not satisfying this local processing condition may indicate that an input that is not accounted for in local control scheme 730 of edge controller 702 is affecting the characteristic of the space. By way of example, a temperature of the space may vary based an amount of sunlight entering through a window, as the amount of sunlight entering the space may correspond to a rate of thermal energy entry into the space. The local control scheme 730 may benefit (e.g., more effectively control the temperature to within a desired range) from the use of light intensity data provided by a light sensor within the space.

Another of the local processing conditions may be based on whether or not a level of processing resources required to process the input data is greater than a threshold level. Specifically, condition checker 740 may determine a level of processing resources required to process the input data and determine if the level of processing resources required to process the input data is greater than a threshold level. To reduce the cost, size, and power consumption of edge device 700, processing circuit 720 may have a lesser amount of processing power available than processing circuit 620 of cloud device 600. By way of example, processing circuit 720 may be capable of completing fewer operations per second than processing circuit 620. Because of this, processing input data at edge device 700 may take a greater period of time than processing input data at cloud device 600. However, if the amount of processing required to analyze the input data is relatively low, the input data may be processed by edge controller 702 without a significant delay. Processing input data locally with edge controller 702 may be beneficial, as less load is exerted on cloud controller 602 and network 112 to transfer and process the input data. In some embodiments, edge controller 702 is dedicated to control of edge device 700, whereas cloud controller 602 can perform a variety of tasks. Accordingly, it may be advantageous to reduce the load on cloud controller 602 to free cloud controller 602 to perform other tasks.

Condition checker 740 may determine the level of processing resources required to process the input data in a variety of ways. By way of example, the level of processing resources may be based on the total size of the input data (e.g., in bytes). By way of another example, the level of processing resources may be based on the amount of inputs in the input data. The threshold level may be predetermined or may vary. If the amount of processing resources required to process the input data is less than the threshold level, the local processing condition may be satisfied.

In some embodiments, one or more edge devices of building system 100 are configured to operate in accordance with one or more policies (e.g., global policies). The policies can be sets of rules that prevent or require the edge devices of building system 100 to perform certain actions. The same policies may apply to multiple edge devices 700. Accordingly, the policies for all of the edge devices 700 may be managed (e.g., determined and distributed to edge devices 700) by cloud device 600. In an example where edge devices 700 include VAV controllers that control dampers, a policy may prevent the VAV controllers from extending the dampers beyond a limit position (e.g., open no more than 30 degrees, etc.). In an example where edge devices 700 include light controllers that operate one or more LEDs, a policy may require that the light controllers utilize at least a minimum brightness of the LEDs (e.g., 15% of the maximum brightness) when the LEDs are turned on.

Another of the local processing conditions may be based on whether or not a response of edge device 700 to the input data would cause edge device 700 to violate one or more policies. Specifically, condition checker 740 and/or another module of edge controller 702 (e.g., command generator 732) may determine a response of edge controller 702 to the input data (e.g., the command that would be provided to actuator 714) and, prior to executing the response, determine whether or not the response would violate one of the policies. If the response is determined to violate one of the policies, then the local processing condition may not be satisfied. Because the policies may affect more than one edge device 700, edge controller 702 may not be permitted to unilaterally change the policy of all of the edge devices 700. Accordingly, edge controller 702 may be required to communicate with cloud controller 602 to determine if (a) edge controller 702 should modify local control scheme 730 to avoid violating one of the policies and/or (b) cloud controller 602 should modify a policy to permit edge controller 702 to respond to the input data without violating one of the policies.

Referring to FIGS. 6, 7, and 10, in step 1006, if the input data failed to exhibit one or more of the local processing conditions, edge controller 702 transmits a processing request to cloud controller 602. Specifically, in response to determining that the input data fails to exhibit one or more of the local processing conditions, condition checker 740 transmits the processing request to cloud controller 602. In some embodiments, condition checker 740 additionally transfers the input data to cloud controller 602 along with the processing request. In other embodiments, cloud controller 602 receives the processing request and the input data at separate times. The processing request and the input data may travel through communications interface 710, across network 112, and through communications interface 610 to reach cloud controller 602.

Referring to FIGS. 6 and 10, in step 1008, cloud controller 602 receives information from devices other than the edge device 700 that provided the processing request. Although step 1008 is shown subsequent to step 1006, step 1008 may occur at any point or at multiple points throughout process 1000. As illustrated in FIGS. 1 and 5, cloud controller 602 can communicate with and/or control the operation of various types of edge devices 700 that are associated with various spaces, buildings, and building equipment domains. Accordingly, information received by cloud controller 602 may relate to various spaces, buildings, and/or building equipment domains.

Cloud controller 602 can be configured to receive information from any edge devices 700 in communication with cloud controller 602. This information may relate to one or more characteristics of a space associated with the edge device 700 that provides the information. Cloud controller 602 can receive information (e.g., sensor data) provided by sensors 712 of the edge devices 700. Additionally or alternatively, cloud controller 602 can receive information (e.g., operational data) relating to the operation of one or more edge devices 700. Cloud controller 602 can also receive information (e.g., external data) from one or more external data sources 540.

Referring again to FIGS. 6 and 10, in step 1010, cloud controller 602 analyzes the input data provided by edge controller 702 based on the information received from the other devices. In step 1012, cloud controller 602 generates an edge control adaptation command based on the analysis. As discussed with respect to step 1008, cloud controller 602 can receive information from many different devices in many different locations. This information can include current data and/or historical data (e.g., stored within one or more historical data managers 750). This information can be used to make more intelligent decisions regarding the control of edge devices 700. However, for various reasons, such as the large amount of processing power required to process all of the information, edge controllers 702 may not normally access all of this information when performing local control decisions according to local control scheme 730. Accordingly, cloud controller 602 may be well suited to analyze the input data provided by edge device 700 and provide an edge control adaptation command to update local control scheme 730 of edge device 700.

Cloud controller 602 may utilize information relating to a second space or a second building equipment domain other than the space or building equipment domain associated with edge device 700 providing the processing request. By way of example, the edge device 700 providing the processing request may be associated with a first space and a first building equipment domain (e.g., HVAC domain 170). Cloud controller 602 may use information provided by edge devices 700 associated the first building equipment domain but associated with a second space when analyzing the input data. By way of example, the edge device 700 that provided the processing request and the edge device 700 that provided the information used by cloud device 600 may both be thermostats, and but the thermostats may be in different rooms. Cloud controller 602 may additionally or alternatively utilize information relating to the first space but associated with a second building domain. By way of example, the edge device 700 that provided the request may be a lighting controller controlling a light intensity of the first space, and the edge device 700 that is providing the information used by cloud device 600 may be a television located within the first space.

In some embodiments, the edge control adaptation command is configured to change the sources from which edge controller 702 retrieves input data. The edge control adaptation command may cause edge controller 702 to add or remove sources of input data (e.g., to subscribe to or unsubscribe from messages provided by another data source, such as another edge controller 702). Additionally or alternatively, the edge control adaptation command may cause edge controller 702 process the input data differently. By way of example, in some embodiments, local control scheme 730 utilizes a neural network to analyze the input data and determine a command for actuator 714. The edge control adaptation command may be configured to vary the weights of one or more nodes of the neural network.

In some embodiments, cloud controller 602 analyzes the input data to determine a command for actuator 714 of the edge device 700. In some embodiments, cloud controller 602 evaluates the input data this way in response to an indication (e.g., included in the processing request) that the processing power required to process the input data was greater than a threshold level. This analysis may follow the same control logic as the local control scheme 730. To facilitate this, the processing request may include instructions describing how the local control scheme 730 would ordinarily analyze the input data. In other embodiments, the analysis follows control logic stored in cloud controller 602. Once a command for actuator 714 has been determined, cloud controller 602 may generate an edge control adaptation command configured to cause edge controller 702 to provide the command to actuator 714.

In some embodiments, cloud controller 602 analyzes the input data to determine if (a) a policy of one or more edge devices 700 should be changed (e.g., to permit some action that would otherwise be prohibited) or (b) local control scheme 730 should be modified to avoid violating a policy. In some embodiments, cloud controller 602 evaluates the input data this way in response to an indication (e.g., included in the processing request) that a response of edge controller 702 to the input data would violate one or more policies. Cloud controller 602 may evaluate a potential policy change based on various criteria, such as an effect on system efficiency, whether changing the policy could cause damage to one or more components, or how many edge devices 700 would be affected by the policy change. If cloud controller 602 determines that the policy change would be beneficial, cloud controller 602 may update the policy for all relevant edge devices 700. Additionally, cloud controller 602 may indicate to edge controller 702 (e.g., through an edge control adaptation command) that edge controller 702 should proceed with its previously determined response now that the response will no longer violate the policy. If the cloud controller 602 determines that a policy change will not be implemented, cloud controller 602 may generate an edge control adaptation command that updates local control scheme 730 to avoid violating the policy.

In some embodiments, cloud controller 602 evaluates the input data to determine if the input data exhibits one or more recognized patterns that are recognized by cloud controller 602. In some embodiments, cloud controller 602 evaluates the input data this way in response to an indication (e.g., included in the processing request) that the input data did not match any of the recognized patterns that are recognized by edge controller 702.

Because cloud controller 602 analyzes information from a large number of sources, cloud controller 602 may have a greater number of recognized patterns than edge controller 702. Where edge controller 702 may receive input data relating to only one space, cloud controller 602 may receive similar types of information from many different spaces. By way of example, where edge controller 702 may be a light controller configured to manage the light intensity of a single space, cloud controller 602 may have received information from many other light controllers that have managed light intensities in many other spaces. Accordingly, cloud controller 602 may have learned how to respond to scenarios that have never been experienced by the edge controller 702 sending the processing request. If the input data matches a recognized pattern of the edge controller 702, cloud controller may generate an edge control adaptation command that adds the pattern of the input data to the recognized patterns of the edge controller 702 and/or updates local control scheme 730 to respond to the recognized pattern.

In some embodiments, the cloud controller 602 is configured to determine if one or more edge devices 700 that have recently been enabled or disabled may be affecting the input data. Cloud controller 602 may detect that an edge device 700 has been enabled when information relating to the operation of the edge device (e.g., sensor data, operational data, etc.) begins to be received by cloud controller 602. Cloud controller 602 may detect that an edge device 700 has been disabled when information relating to operation of the edge device 700 stops being received. Enablement of an edge device 700 may indicate that the edge device 700 has recently been added to a space or turned on. Similarly, disablement of an edge device 700 may indicate that the edge device 700 has recently been removed from a space or turned off.

In some embodiments, cloud controller 602 is configured to compare the input data with any disablement or enablement events to determine if the disablement or enablement of an edge device 700 may be effecting the input data. In some embodiments, cloud controller 602 receives information relating to the location of one or more edge devices 700 (e.g., which spaces edge devices 702 are located in, which spaces have characteristics that are affected by edge devices 700, etc.). Cloud controller 602 may additionally or alternatively receive information relating to the quantity and/or type (e.g., printers, user devices, security cameras, etc.) of edge devices that have been enabled or disabled within a space. Cloud controller 602 may analyze the locations of any enablement or disablement events to determine if any enablement or disablement events occurred in the space associated with the edge controller 702 that provided the processing request. Additionally or alternatively, cloud controller 602 may compare the time at which the enablement event occurred against a time related to the input data (e.g., against a time at which the input data was received, against a time at which the input data was recorded, against a time at which input data did not match a recognized pattern, etc.) to determine if the enablement or disablement event may have affected the input data. Upon determining that the enablement or disablement event has affected the input data, cloud controller 602 may generate an edge control adaptation command configured to adjust local control scheme 730 to reflect the enablement or disablement of the corresponding edge device 700.

By way of example, the edge device 700 that provided the processing request may be a thermostat configured to control a temperature of a space. One or more printers, computers, or other heat generating devices may be added to the space, increasing the temperature of the space. Edge controller 702 may detect that sensor data relating to the temperature of the space no longer reflects a recognized pattern or otherwise detect that the temperature is acting unexpectedly. In response, the thermostat may issue a processing request to cloud controller 602. Upon receiving the processing request, cloud controller 602 may determine that the heat generating devices were enabled in the space associated with the thermostat near the time that the input data failed to follow a recognized pattern. Edge control adaptation command generator 640 may then generate an edge control adaptation command configured to cause local control scheme 730 to utilize input data from the heat generating devices. By way of example, the input data may include operational data indicating an on/off state of the heat generating devices. The thermostat may then control the temperature accounting for the operation of the heat generating devices.

Referring to FIGS. 6, 7, and 10, in step 1014, cloud controller 602 transfers the edge control adaptation command to edge controller 702. In step 1016, in response to receiving the edge control adaptation command, command generator 732 of edge controller 702 updates local control scheme 730 according to the edge control adaptation command. In step 1018, command generator 732 controls edge device 700 by generating a command for actuator 714 based on local control scheme 730. However, if in step 1004, condition checker 740 determines that the input data meets all of the local processing conditions, then process 1000 may skip directly to step 1018. Step 1008 may be completed, even in this circumstance.

Command generator 732 may utilize the input data to determine the command. By way of example, local control scheme 730 may include local control logic (e.g., a neural network, a PID controller, etc.) that accepts the input data as inputs and provides the command as an output. The command from command generator 732 may cause actuator 714 to perform one or more functions. By way of example, if the actuator 714 includes a motor, the command may cause the motor to run at a target speed, torque, and/or direction. By way of another example, if the actuator 714 includes an LED, the command may cause the LED to operate at a target brightness, color, or strobing frequency.

Referring to FIGS. 6, 7, and 10, in step 1020, historical data managers 750 of cloud controller 602 and/or edge controller 702 store historical data 752. Specifically, historical data 752 can include a command sent to actuator 714 and the corresponding effect the command had on the space associated with edge device 700. Historical data 752 may additionally or alternatively include other information, such as the sensor data or operational data from one of edge device 700. Cloud controller 602 can gather and record historical data 752 and share it with edge controller 702 or vice versa. Additionally or alternatively, historical data 752 may be stored in only one of cloud controller 602 and edge controller 702. Historical data 752 may be provided as information to cloud controller 602 in step 1008 and used to analyze the input data. In other embodiments, step 1020 is omitted.

In step 1022, historical data manager 750 of edge controller 702 modifies local control scheme 730 based on historical data 752. Specifically, historical data manager 750 may generate an edge control adaptation request, and command generator 732 may modify local control scheme 730 based on the edge control adaptation request. By utilizing historical data 752, the devices of building system 100 can predict what results different actions are likely to achieve based on the results that that action achieved previously. Using this predictive ability can further increase the accuracy of local control scheme 730. One example of this is described herein with respect to FIG. 13. In other embodiments, step 1022 is omitted.

After process 1000 has been completed, process 1000 may restart (e.g., from step 1002). Process 1000 can continuously control actuator 714 to achieve and/or maintain a desired state (e.g., a temperature set point, a humidity set point, a desired range of light intensities, etc.). Additionally, each time process 1000 is completed, more data can be gathered and local control scheme 730 can be further refined. Accordingly, the more times that process 1000 is completed, the more accurate the control of all of edge devices 700 can be.

Figure 11:
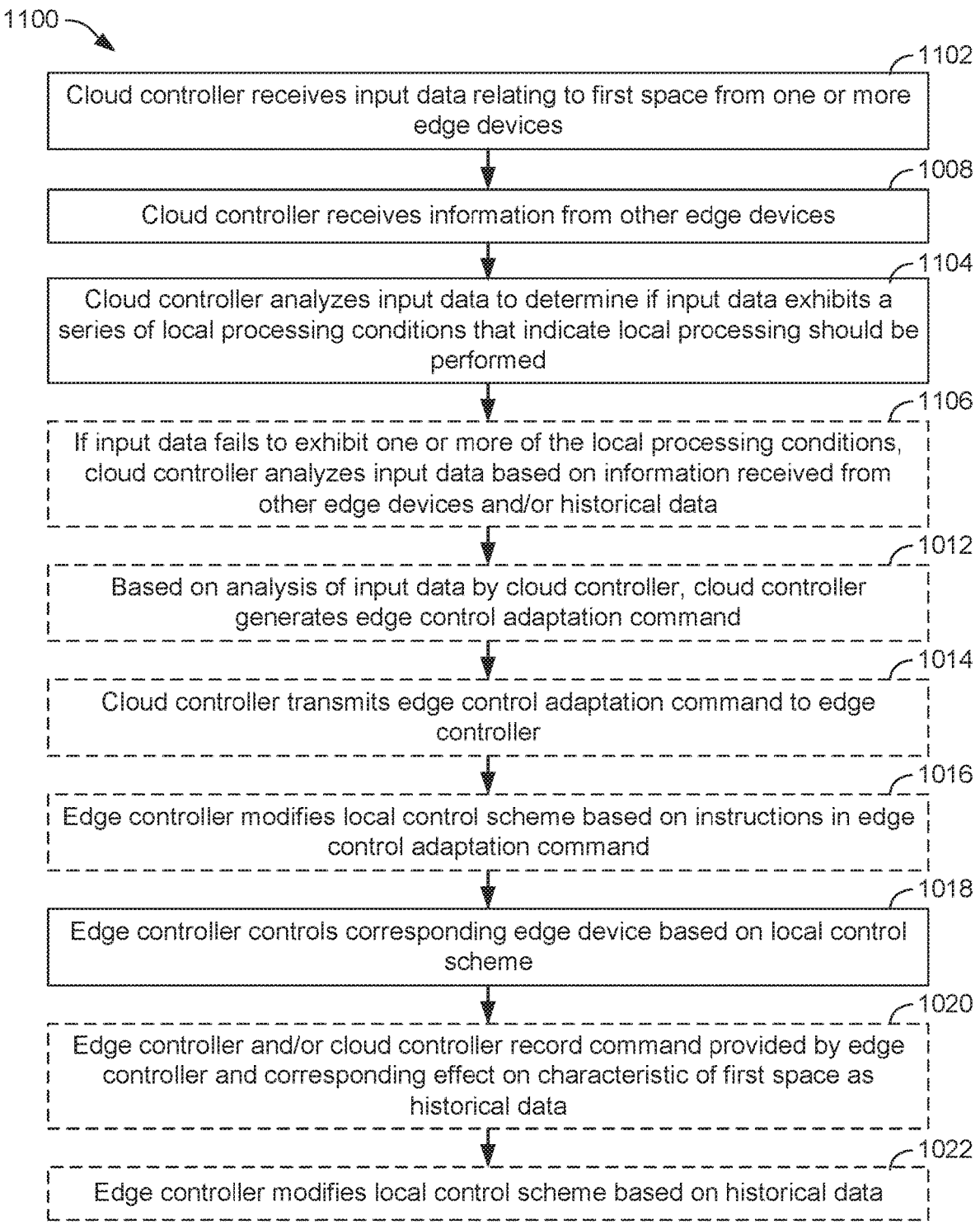
FIG. 11 is a block diagram illustrating a process of controlling building equipment, according to an exemplary embodiment.

Referring to FIG. 11, an alternative process 1100 for controlling building equipment is shown, according to some embodiments. Building system 100 may utilize one or both of processes 1000 and 1100. Process 1100 is largely the same as process 1000, except cloud controller 602 determines if the input data exhibits the local processing conditions and is therefore suitable for local processing.

Referring to FIGS. 6 and 11, in step 1102, cloud controller 602 receives input data. In some embodiments, the input data is first received by the edge device 700 that is being controlled by cloud controller 602, and edge controller 702 transfers the input data to cloud controller 602 (e.g., without first determining if the input data meets any local processing conditions). In step 1008, cloud controller 602 also receives information from one or more other sources. As in process 1000, step 1008 can be completed at any time.

Referring to FIGS. 6 and 11, in step 1104, cloud controller 602 analyzes the input data to determine if the input data exhibits a series of local processing conditions that indicate local processing should be performed. Step 1104 may be substantially similar to step 1004, except step 1104 is performed by cloud controller 602. In step 1104, cloud controller 602 can utilize condition checker 630 to analyze the input data to determine if the input data exhibits all of a series of local processing conditions that indicate the input data should be processed locally. Input data that exhibits all of the local processing conditions may be input data that can be efficiently and accurately be processed by edge controller 702 without cloud controller 602 providing additional assistance (e.g., additional processing or information). Input data that fails to exhibit one or more of the local processing conditions may benefit from some processing being completed by cloud controller 602. Although some specific examples of local processing conditions are provided herein, condition checker 630 may check if the input data exhibits more, fewer, or alternative local processing conditions in step 1104.

In step 1104, cloud controller 602 may utilize any of the local processing conditions described with respect to step 1004. By way of example, cloud controller 602 may determine if the input data matches one or more recognized patterns that are recognized by edge controller 702. The cloud controller 602 may store or otherwise determine what recognized patterns are recognized by edge controller 702. Additionally or alternatively, one of the local processing conditions may relate to the recent enablement or disablement of one or more edge devices 700. Cloud controller 602 may determine if one or more edge devices 700 that have the potential to affect the operation of the edge device 700 that is being controlled have recently been enabled or disabled. This may be similar to the process described above with respect to step 1010. If cloud controller 602 determines that one or more edge devices 700 that have the potential to affect the operation of the edge device 700 that is being controlled have recently been enabled or disabled, the local processing condition may not be satisfied.

If all of the local processing conditions are satisfied, process 1100 may proceed to step 1018. If one or more of the local processing conditions are not satisfied, process 1100 may proceed to step 1106. Step 1106 may be substantially similar to step 1010. In either situation, the remainder of process 1100 may be substantially similar to process 1000. Once process 1100 is complete, process 1100 may be repeated or process 1000 may be initiated. Processes 1000 and 1100 may be interchangeable. By way of example, either of process 1000 or process 1100 can be initiated after either of process 1000 or process 1100 have been completed.

Default Local Control Schemes

Referring to FIG. 7, memory 724 of each edge device 700 may include multiple local control schemes 730. By way of example, local control schemes 730 may include a working control scheme and a factory default control scheme. The working control scheme may be the local control scheme 730 that is normally in use by edge controller 702. The working control scheme may be modified whenever command generator 732 receives an edge control adaptation command. Because the working control scheme is stored locally in memory 724, edge device 700 may continue to operate based on the working control scheme, even when edge device 700 is not in communication with cloud device 600. In the event that edge device 700 loses communication with cloud device 600, edge device 700 may default to operation according to the working control scheme. When the connection is reestablished, cloud controller 602 may then continue to modify the working control scheme through edge control adaptation commands.

The factory default control scheme may be installed in memory 724 during manufacturing of edge device 700. The factory default control scheme may not be modified by edge controller 702. Instead, the factory default control scheme may remain in a state that is known to function properly. Edge controller 702 may switch to the factory default control scheme upon detecting an error or fault condition. Additionally or alternatively, edge controller 702 may switch to the factory default control scheme upon a request from a user.

Control Logic

When generating the command that will be provided to actuator 714, cloud controller 602 and/or edge controller 702 may use a variety of different control logic strategies. The control logic may take the form of a mathematical controller that utilizes the input data as inputs and provides the command for actuator 714 or a quantity related to such a command as an output. The control logic may be stored in cloud controller 602 (e.g., in edge control adaptation command generator 640) and/or in the edge device (e.g., as part of local control scheme 730). The control logic in cloud controller 602 may or may not be the same as the control logic in edge controller 702.

In some embodiments, the control logic includes a proportional, integral, and/or derivative controller. Such controllers may utilize the input data itself (e.g., performing a proportional action), the rate of change of the input data (e.g., performing a derivative action), and/or a total error of the input data relative to a target value over time (e.g., performing an integral action). Each of these components may be multiplied by a constant and summed to generate the command. These constants may be selected to control the response of the control logic to the input data. These constants may be varied when the control logic is updated. The control logic may include any combination of a proportional controller, an integral controller, or a derivative controller (e.g., a P controller, a D controller, an I controller, a PD controller, a PID controller, etc.). In other embodiments, the control logic does not include one or more of proportional control logic, derivative control logic, or integral control logic.

Figure 12:
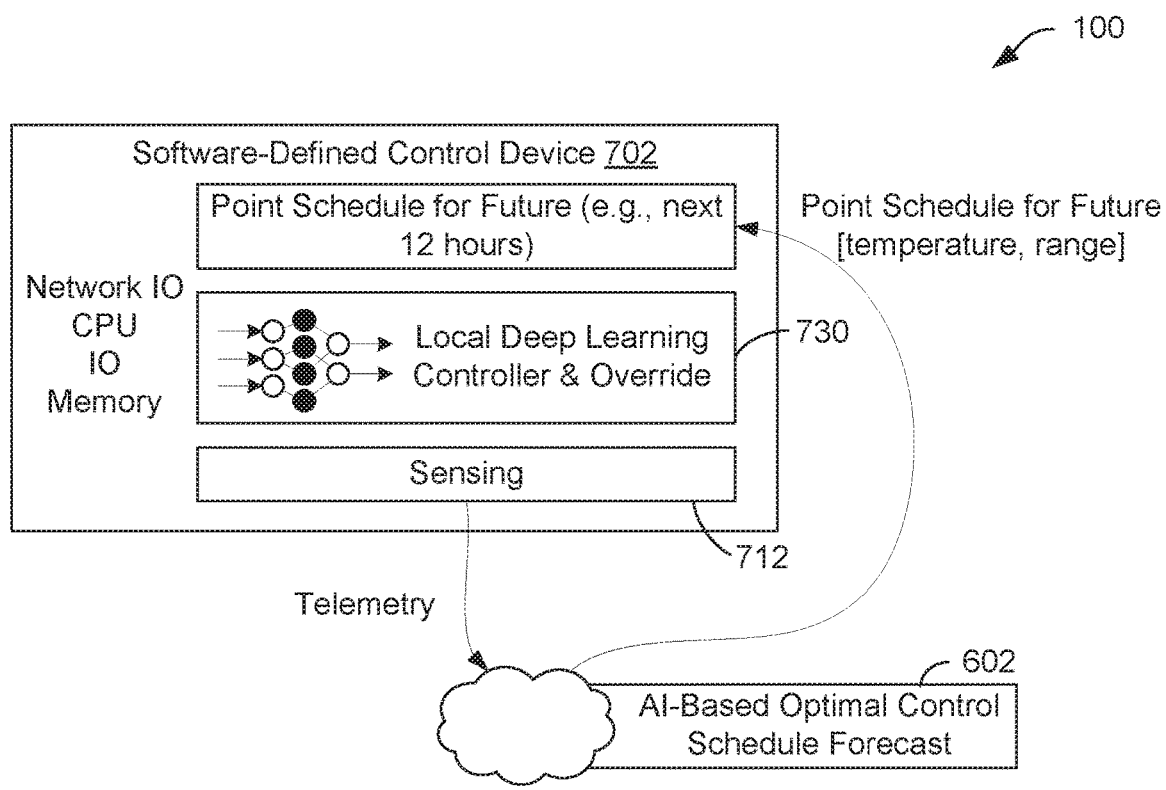
FIG. 12 is a block diagram illustrating the operation of a building management system controlling building equipment, according to an exemplary embodiment.

In some embodiments, the control logic includes learning control logic, such as a neural network. Referring to FIG. 12, a building system 100 is configured to utilize a neural network, according to some embodiments. Specifically, an edge controller 702 (e.g., implemented as a software-designed controller within cloud device 600, which may be an on-site device) is in communication with cloud controller 602. Sensors 712 provide data (e.g., telemetry data) to cloud controller 602, and cloud controller 602 sends an edge control adaptation command (e.g., indicating updates to local control scheme 730 lasting 12 hours). The edge controller 702 controls an actuator 714 utilizing a neural network of local control scheme 730.

When using a neural network, the input data may be provided to a series of nodes. Each node includes an equation that utilizes the input data and a series of weights or constants. These nodes may be arranged such that the output of one group of nodes is provided as an input to a subsequent group of nodes. The output of the last group of nodes may be the command for actuator 714. The neural network may be "trained" to determine an optimal set of constants for each node. To train the neural network, sets of data having sample inputs and corresponding sample outputs may be used to determine accurate sets of constants for each node. By way of example, random constants may initially be chosen, and the constants may be varied to determine what effect each constant has on the accuracy of the output. Once a set of constants has been found that accurately (e.g., within an acceptable accuracy range) determines an output from the sample data, the neural network may be considered to be trained.

In some embodiments, one or both of cloud controller 602 and edge controller 702 utilize a neural network to determine the command of actuator 714. In some such embodiments, the neural network is trained using information stored in cloud controller 602 as the sample data. By way of example, the information provided to cloud controller in step 1008 may be used as the sample data. By way of another example, historical data 752 may be used as the sample data.

Figure 13:
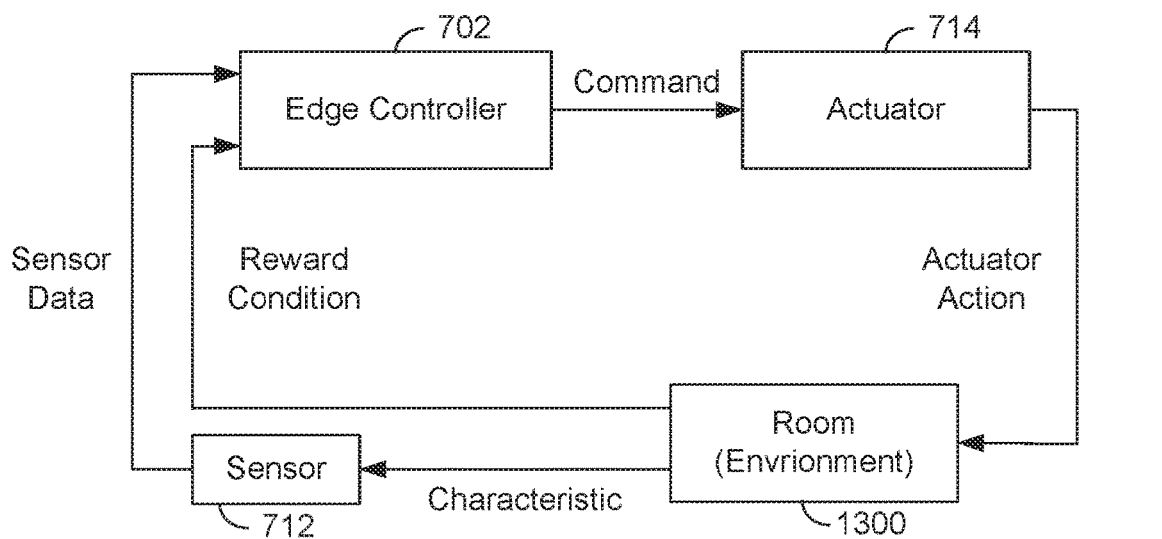
FIG. 13 is a block diagram illustrating the operation of a building management system controlling building equipment, according to an exemplary embodiment.

In some embodiments, the control logic includes other learning control logic. This learning logic can include probability-based control logic. Referring to FIG. 13, building system 100 utilizes probability-based control logic, according to some embodiments. Although FIG. 13 illustrates edge controller 702 utilizing the probability-based control logic, it should be understood that similar control logic may be used by cloud controller 602. In this arrangement, edge controller 702 can receive input data (e.g., sensor data) from sensor 712. Edge controller 702 can also receive a reward condition. The reward condition may represent a desired result. In some embodiments, the reward condition is provided by a user (e.g., as a set point for building system 100). Using the sensor data and the reward condition, edge controller 702 can generate a command for actuator 714 according to the probability-based control logic. Actuator 714 can perform an action according to the command, affecting a characteristic of a space 1300 (e.g., a room). Sensor 712 can then observe the characteristic to generate the sensor data. Edge controller 702 can record the sensor data before the action is performed, the command given to actuator 714, and the sensor data after the action is performed (e.g., as historical data). This information may then be used to adjust the control logic of edge device 700.

According to an exemplary embodiment, sensor 712 may be a thermometer, actuator 714 may control a position of a damper, and space 1300 may be a room. The characteristic of space 1300 that is being controlled may be the temperature of space 1300. To begin, edge controller 702 may operate the actuator 714 in a constant state for a period of time (e.g., 15 minutes). The results of this test are shown in Table 1 below:

TABLE 1

Results After First Test

| Temp. Before | Damper Position | Temp. After | Observations | Probability % |
|---|---|---|---|---|
| 68 | Open 15 Degrees | 70 | 1 | 100 |

For every observation that has occurred up to this point, opening the damper to 15 degrees changes the temperature from 68 degrees to 70 degrees. Because only one observation has been recorded, the local control logic considers this situation to have a 100% probability of occurring when the temperature begins at 68 degrees and the damper is opened 15 degrees. While this may not be accurate, the accuracy improves as more observations are taken. Referring to Table 2 below, during operation 384 more observations are taken with the damper opened 15 degrees, and 369 observations are taken with the damper closed 15 degrees:

TABLE 2

Results After Additional Testing

| Temp. Before | Damper Position | Temp. After | Opportunities | Observations | Probability % |
|---|---|---|---|---|---|
| 68 | Open 15 Degrees | 68 | 385 | 9 | 2.3 |
| 68 | Open 15 Degrees | 69 | 385 | 88 | 22.9 |
| 68 | Open 15 Degrees | 70 | 385 | 198 | 51.4 |
| 68 | Open 15 Degrees | 71 | 385 | 76 | 19.7 |
| 68 | Open 15 Degrees | 72 | 385 | 13 | 3.4 |
| 68 | Open 15 Degrees | 73 | 385 | 1 | 0.3 |
| 68 | Close 15 Degrees | 65 | 369 | 5 | 1.3 |
| 68 | Close 15 Degrees | 66 | 369 | 93 | 25.2 |
| 68 | Close 15 Degrees | 67 | 369 | 158 | 42.8 |
| 68 | Close 15 Degrees | 68 | 369 | 72 | 19.5 |
| 68 | Close 15 Degrees | 70 | 369 | 41 | 11 |

Using the data set of Table 2, the probability-based control logic may be used to determine how to control actuator 714. By way of example, a user may indicate that they wish for room 1300 to have a temperature of 70 degrees when room 1300 has a temperature of 68 degrees. Accordingly, the reward condition may be achieving a temperature of 70 degrees. Based on the data in Table 2, the target temperature of 70 degrees may be achieved either by opening the damper 15 degrees or closing the damper 15 degrees. However, opening the damper has a 51.4% chance of achieving the reward condition, whereas closing the damper only has an 11% chance of achieving the reward condition. Accordingly, the control logic will choose to open the damper.

Other variables may further be accounted for to increase the accuracy of the control logic. By way of example, Table 3 illustrates the addition of an occupancy state (e.g., yes=occupied, no=not occupied) and an outdoor air temperature (i.e., OAT):

TABLE 3

Results with Additional Variables

| Occupancy | OAT | Temp. Before | Damper Position | Temp. After | Opps. | Observs. | Probability % |
|---|---|---|---|---|---|---|---|
| Yes | 45 | 68 | Open 15 Degrees | 68 | 385 | 9 | 2.3 |
| Yes | 45 | 68 | Open 15 Degrees | 69 | 385 | 88 | 22.9 |
| Yes | 45 | 68 | Open 15 Degrees | 70 | 385 | 198 | 51.4 |
| Yes | 45 | 68 | Open 15 Degrees | 71 | 385 | 76 | 19.7 |
| Yes | 45 | 68 | Open 15 Degrees | 72 | 385 | 13 | 3.4 |
| Yes | 45 | 68 | Open 15 Degrees | 73 | 385 | 1 | 0.3 |
| Yes | 45 | 68 | Close 15 Degrees | 65 | 369 | 5 | 1.3 |
| Yes | 45 | 68 | Close 15 Degrees | 66 | 369 | 93 | 25.2 |
| Yes | 45 | 68 | Close 15 Degrees | 67 | 369 | 158 | 42.8 |
| Yes | 45 | 68 | Close 15 Degrees | 68 | 369 | 72 | 19.5 |
| Yes | 45 | 68 | Close 15 Degrees | 70 | 369 | 41 | 11 |

The inclusion of additional variables can increase the processing power required to process the data. Accordingly, as more variables are accounted for, it may be desired to perform the processing using the additional processing power of cloud controller 602.

CONFIGURATION OF EXEMPLARY EMBODIMENTS

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method of controlling equipment of a building, comprising:
    receiving, by a first edge controller, data relating to a first space, the first edge controller configured to control operation of a first edge device affecting a characteristic of the first space, the first edge device associated with a first building equipment domain of a plurality of building equipment domains;
    analyzing, by the first edge controller, the data to determine whether the data satisfies a condition;
    in response to determining the data satisfies the condition, controlling, by the first edge controller, operation of the first edge device using the data;
    in response to determining the data does not satisfy the condition:
        transmitting, by the first edge controller, a request to a cloud controller to analyze the data, the cloud controller configured to analyze the data based on information obtained by the cloud controller regarding at least one of a second space or a second building equipment domain;
        receiving, at the first edge controller from the cloud controller, a response to the request including an edge control adaptation command;
        modifying, by the first edge controller based on the edge control adaptation command, a local control scheme of the first edge controller to utilize additional data provided by a second edge controller of a second edge device, wherein the edge control adaptation command is configured to cause the first edge controller to retrieve the additional data directly from the second edge controller without the additional data passing through the cloud controller; and
        controlling, by the first edge controller, operation of the first edge device according to the modified local control scheme.

2. The method of claim 1, wherein the first edge controller is a software agent implemented within at least one server separate from the first edge device.

3. The method of claim 2, wherein a third edge controller is a second software agent implemented within the at least one server, and wherein the third edge controller is configured to control operation of a third edge device affecting a characteristic of the second space.

4. The method of claim 1, wherein the cloud controller is implemented within a cloud server, wherein the first space is defined within a first building, and wherein the cloud server is located within one of (a) the first building or (b) a second building of a building complex that includes the first building.

5. The method of claim 1, wherein the cloud controller is distributed across at least two cloud servers.

6. The method of claim 1, wherein the first edge controller is implemented on the first edge device, wherein the cloud controller is operatively coupled to a third edge device, and wherein the cloud controller is distributed across the first edge device and the third edge device.

7. The method of claim 1, wherein controlling, by the first edge controller, operation of the first edge device using the data includes:
    analyzing, by the first edge controller, the data using a first neural network; and
    controlling the first edge device based on the analysis of the data by the first edge controller, and
    wherein controlling, by the first edge controller, operation of the first edge device using the additional data from the second edge controller of the second edge device identified in the response from the cloud controller includes:
modifying, by the first edge controller, the first neural network based on the response from the cloud controller;
analyzing, by the first edge controller, the data and the additional data using the modified first neural network; and
controlling the first edge device based on the analysis of the data and the additional data by the first edge controller.

8. The method of claim 7, wherein the cloud controller is configured to analyze the data using a second neural network, and wherein the second neural network is trained based on the information obtained by the cloud controller regarding the at least one of the second space or the second building equipment domain.

9. The method of claim 1, wherein analyzing, by the first edge controller, the data to determine whether the data satisfies the condition includes comparing the data against a plurality of recognized patterns, and wherein determining that the data does not satisfy the condition includes determining that the data does not match at least one of the recognized patterns.

10. The method of claim 1, wherein analyzing, by the first edge controller, the data to determine whether the data satisfies the condition includes determining a level of processing resources required to process the data, and wherein determining that the data does not satisfy the condition includes determining that that the level of processing resources required to process the data is greater than a threshold level.

11. The method of claim 1, wherein analyzing, by the first edge controller, the data to determine whether the data satisfies the condition includes determining whether a response of the first edge controller to the data would violate a policy of the first edge controller, and wherein determining that the data does not satisfy the condition includes determining that the response of the first edge controller to the data would violate the policy of the first edge controller.

12. The method of claim 1, wherein the first edge controller is part of an edge control layer, wherein the cloud controller is part of a cloud control layer, and wherein the edge control layer communicates directly with the cloud control layer without the use of an intermediate control layer.

13. The method of claim 1, further comprising:
recording, by at least one of the cloud controller and the first edge controller, historical data relating to a command provided by the first edge controller and a corresponding change of the characteristic of the first space; and
modifying, by the first edge controller, the local control scheme of the first edge controller based on the historical data.

14. The method of claim 13, wherein the local control scheme of the first edge controller does not utilize any one of proportional control logic, integral control logic, or derivative control logic.

15. The method of claim 1, wherein the data includes temperature data, wherein the characteristic is a temperature of the first space, wherein the first edge device is a thermostat configured to control at least one actuator to affect the temperature of the first space, and wherein the information obtained by the cloud controller regarding at least one of the second space or the second building equipment domain relates to an occupancy level of the first space.

16. The method of claim 1, wherein the data includes temperature data, wherein the characteristic is a temperature of the first space, wherein the first edge device is a thermostat configured to control at least one actuator to affect the temperature of the first space, and wherein the information obtained by the cloud controller regarding at least one of the second space or the second building equipment domain relates to at least one of a quantity of second edge devices associated with the first space or a type of second edge devices associated with the first space.

17. A method of controlling equipment of a building, comprising:
receiving, at a cloud controller, a request to analyze data relating to a first space from a first edge controller, the first edge controller configured to control operation of a first edge device affecting a characteristic of the first space, the first edge device associated with a first building equipment domain of a plurality of building equipment domains;
analyzing, by the cloud controller, the data based on information obtained by the cloud controller regarding at least one of a second space or a second building equipment domain;
generating, by the cloud controller based on the analysis of the data, an edge control adaptation command configured to cause the first edge controller to modify a local control scheme of the first edge controller to utilize additional data provided by a second edge controller of a second edge device, wherein the edge control adaptation command is configured to cause the first edge controller to retrieve the additional data directly from the second edge controller without the additional data passing through the cloud controller; and
transmitting, by the cloud controller, the edge control adaptation command to the first edge controller.

18. The method of claim 17, wherein the local control scheme includes a neural network configured to utilize the data relating to the first space, and wherein the adaptation command is configured to cause the first edge controller to modify the neural network of the local control scheme based on the analysis of the data by the cloud controller.

19. The method of claim 17, wherein the characteristic is a first characteristic, wherein the second edge controller is configured to control operation of the second edge device to affect a second characteristic of the first space, and wherein the second edge device is associated with the second building equipment domain.

20. The method of claim 17, wherein the second edge controller is configured to control operation of the second edge device to affect a characteristic of the second space.

21. The method of claim 17, wherein analyzing, by the cloud controller, the data based on the information obtained by the cloud controller regarding at least one of the second space or the second building equipment domain includes determining whether the data satisfies a condition,
wherein the edge control adaptation command is generated in response to determining that the data satisfies the condition, and
wherein the edge control adaptation command is configured to cause the first edge controller to modify the local control scheme such that the first edge controller:
determines locally whether subsequent data satisfies the condition; and in response to determining that the subsequent data satisfies the condition, controls the first edge device without requesting for the cloud controller to analyze the subsequent data.

22. The method of claim 21, wherein determining whether the data satisfies the condition includes comparing the data against a plurality of recognized patterns, and wherein the data satisfies the condition when the data matches one of the recognized patterns.

23. The method of claim 17, wherein the first edge controller is a software agent implemented within at least one server separate from the first edge device, and wherein the first edge controller is configured to subscribe to messages transmitted by a third edge controller of a third edge device.

24. The method of claim 17, wherein the first edge controller is part of an edge control layer, wherein the cloud controller is part of a cloud control layer, and wherein the edge control layer communicates directly with the cloud control layer without the use of an intermediate control layer.

25. A method of controlling equipment of a building, comprising:
- determining, by a cloud controller, whether data relating to a first space satisfies a condition, the first space having a characteristic affected by an edge device, the edge device associated with a first building equipment domain of a plurality of building equipment domains;
- in response to determining the data does not satisfy the condition:
  - analyzing, by the cloud controller, the data based on information obtained by the cloud controller regarding at least one of a second space or a second building equipment domain;
  - generating, by the cloud controller based on the analysis of the data, an edge control adaptation command configured to cause an edge controller to modify a local control scheme of the edge controller, the edge controller configured to control operation of the edge device according to the modified local control scheme; and
  - transmitting, by the cloud controller, the edge control adaptation command to the edge controller,
- wherein determining that the data does not satisfy the condition includes at least one of (a) determining that the data includes information relating to operation of a second edge device that was not previously in communication with the cloud controller or (b) determining that the data does not include information relating to operation of a third edge device that was previously in communication with the cloud controller.

26. The method of claim 25, wherein determining that the data does not satisfy the condition includes at least one of (a) determining that the data includes the information relating to the operation of the second edge device that was not previously in communication with the cloud controller or (b) determining that the data does not include the information relating to operation of the third edge device that was previously in communication with the cloud controller and further includes determining that the data does not match at least one of a plurality of recognized patterns.

* * * * *